US012625296B2

(12) United States Patent
Jin et al.

(10) Patent No.: US 12,625,296 B2
(45) Date of Patent: May 12, 2026

(54) SYSTEM AND METHOD FOR ENHANCING PETROPHYSICAL CHARACTERIZATION OF POROUS MEDIA

(71) Applicant: Baker Hughes Oilfield Operations LLC, Houston, TX (US)

(72) Inventors: Guodong Jin, Houston, TX (US); Ryan Antle, Houston, TX (US); Brian Reeves, Houston, TX (US); Jeremy Vandam, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 560 days.

(21) Appl. No.: 17/840,106

(22) Filed: Jun. 14, 2022

(65) Prior Publication Data

US 2022/0397699 A1    Dec. 15, 2022

Related U.S. Application Data

(60) Provisional application No. 63/210,808, filed on Jun. 15, 2021.

(51) Int. Cl.
| | |
|---|---|
| *G01V 20/00* | (2024.01) |
| *G01V 3/20* | (2006.01) |
| *G01V 3/32* | (2006.01) |
| *E21B 49/00* | (2006.01) |
| *G01V 3/34* | (2006.01) |

(52) U.S. Cl.
CPC ............... *G01V 20/00* (2024.01); *G01V 3/20* (2013.01); *G01V 3/32* (2013.01); *E21B 49/00* (2013.01); *G01V 3/34* (2013.01)

(58) Field of Classification Search
USPC .......................................................... 702/12
See application file for complete search history.

(56) References Cited

U.S. PATENT DOCUMENTS

| | | | |
|---|---|---|---|
| 4,817,062 A | 3/1989 | De Buyl | |
| 7,135,870 B2 | 11/2006 | Mohajer | |
| 2004/0034474 A1 | 2/2004 | Herron | |
| 2007/0061082 A1* | 3/2007 | Seleznev .................. G01V 3/30 |
| | | | 702/11 |
| 2014/0184230 A1 | 7/2014 | Anderson | |
| 2014/0318232 A1* | 10/2014 | Pairoys .................. E21B 49/00 |
| | | | 73/152.05 |

(Continued)

OTHER PUBLICATIONS

International Search Report and Written Opinion mailed Sep. 21, 2022 in corresponding PCT Application No. PCT/US22/33568.

(Continued)

*Primary Examiner* — Paul D Lee
(74) *Attorney, Agent, or Firm* — Hogan Lovells US LLP

(57) ABSTRACT

A system for analysis of a porous formation is disclosed. Such a system can provide electrical signals for one or more of the porous formation or a representation of the porous formation; can determine, using the electrical signals, permittivity and conductivity measures for the porous formation or the representation of the porous formation; and can model the permittivity and conductivity measures to generate a first estimation model associated with pore features for the porous formation, so that a downhole rock formation can be evaluated for pore connectivity, permeability, and Archie's texture parameters using estimation models.

21 Claims, 14 Drawing Sheets

(56)　　　　　　　References Cited

U.S. PATENT DOCUMENTS

| | | | |
|---|---|---|---|
| 2018/0164466 A1* | 6/2018 | Zhang | G01V 3/30 |
| 2020/0005013 A1* | 1/2020 | Zhao | G06T 7/11 |
| 2020/0132875 A1* | 4/2020 | Zhang | E21B 47/003 |
| 2021/0285902 A1* | 9/2021 | Elsayed | G01V 3/32 |

OTHER PUBLICATIONS

Niu et al., "A Framework for Pore-Scale Simulation of Effective Electrical Conductivity and Permittivity of Porous Media in the Frequency Range From 1 mHz to 1 GHZ," Journal of Geophysical Research: Solid Earth, 125, Oct. 5, 2020, e2020JB020515. https://doi. org/10.1029/2020JB020515.

* cited by examiner

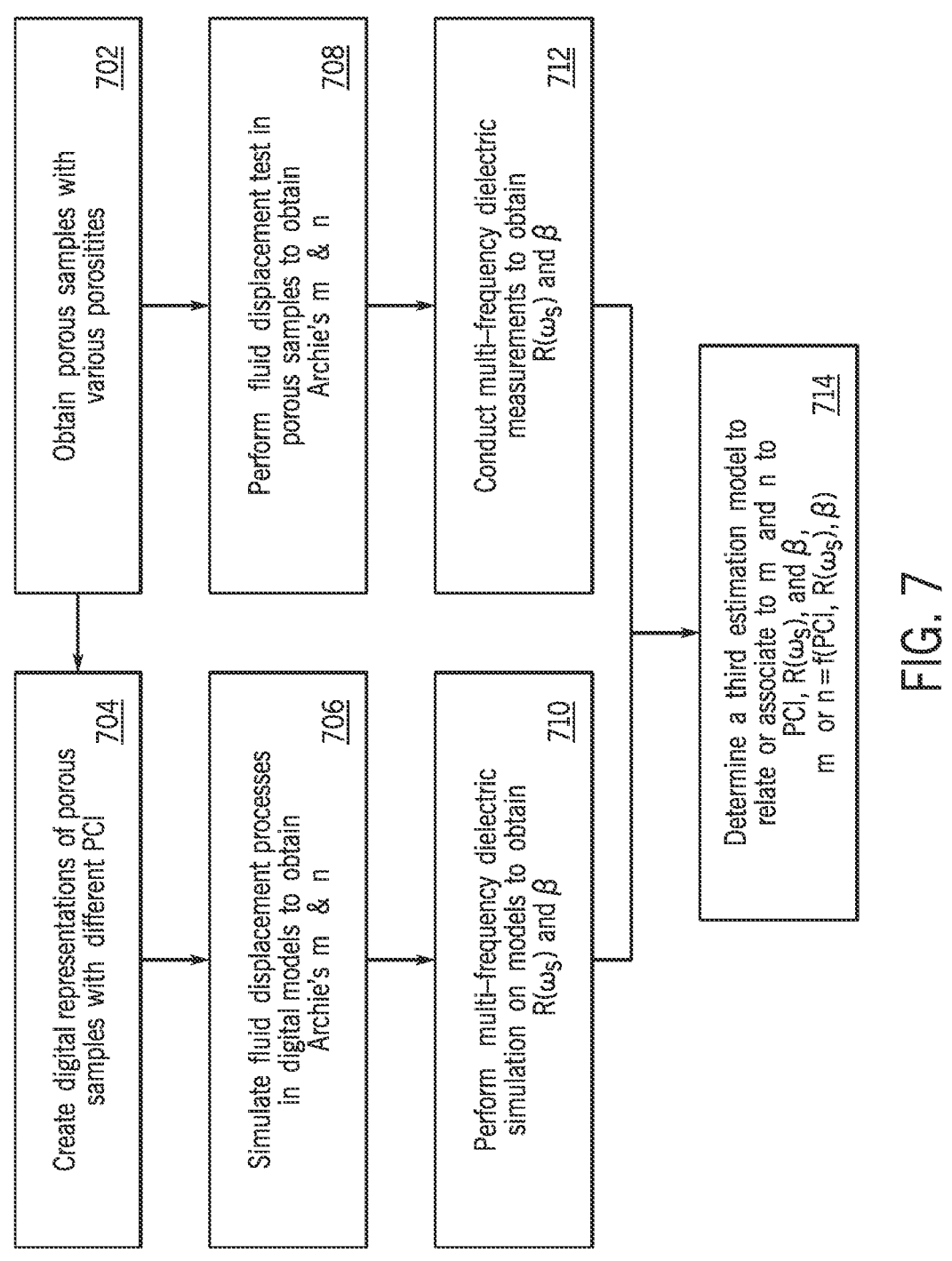

Obtain porous samples with various porosities 702

Perform fluid displacement test in porous samples to obtain Archie's m & n 708

Conduct multi-frequency dielectric measurements to obtain $R(\omega_s)$ and $\beta$ 712

Create digital representations of porous samples with different PCI 704

Simulate fluid displacement processes in digital models to obtain Archie's m & n 706

Perform multi-frequency dielectric simulation on models to obtain $R(\omega_s)$ and $\beta$ 710

Determine a third estimation model to relate or associate to m and n to PCI, $R(\omega_s)$, and $\beta$, m or $n = f(PCI, R(\omega_s), \beta)$ 714

SYSTEM AND METHOD FOR ENHANCING PETROPHYSICAL CHARACTERIZATION OF POROUS MEDIA

CROSS-REFERENCES TO RELATED APPLICATIONS

This application is a related to and claims the benefit of priority from U.S. Provisional Application No. 63/210,808, titled SYSTEM AND METHOD FOR ENHANCING PETROPHYSICAL CHARACTERIZATION OF POROUS MEDIA, and filed on Jun. 15, 2021, the entire disclosure of which is hereby incorporated by reference herein for all intents and purposes.

BACKGROUND

1. Field of Invention

The disclosure herein relates in general to equipment used in the natural gas industry, and in particular, to analysis of pore connectivity, permeability, and Archie's texture parameters of porous formations using permittivity and conductivity from electrical signals supported by other subsystems.

2. Description of the Prior Art

A drilling well is a structure formed in subterranean or underwater geologic structures, or layers. Such subterranean or underwater geologic structures or layers incorporate pressure that may be further enhanced by supplementing formation fluids (such as liquids, gasses or a combination) into a drill site or a well site (such as a wellbore). Wireline logging tools may be used with capability to evaluate Nuclear magnetic resonance (NMR) measurements used in porous formation to provide a pore size distribution of a porous formation. However, it may not provide a degree of pore connectivity that may be useful to understand how individual pores are connected to each other. When pores are isolated from a network of void spaces in a porous formation, or connected to a network via narrow throats, they contribute very little to permeability, but can still contribute to a total porosity.

SUMMARY

In at least one embodiment, a system for analysis of a porous formation is disclosed. An electrical subsystem can provide electrical signals for one or more of the porous formation or a representation of the porous formation. At least one processor can execute instructions from a memory to cause the system to perform functions, including to determine, using the electrical signals, permittivity and conductivity measures for the porous formation or the representation of the porous formation. Modelling is enabled, using the permittivity and conductivity measures to generate a first estimation model associated with pore features for the porous formation, so that the first estimation model can be used to estimate or predict a first petrophysical characteristic of a downhole rock formation.

In at least one embodiment, a method for analysis of a porous formation is also disclosed. The method includes providing, using an electrical subsystem, electrical signals for one or more of the porous formation or a representation of the porous formation. The method includes executing, using at least one processor, instructions from a memory to cause the at least one processor to perform functions. A function includes determining, using the electrical signals, permittivity and conductivity measures for the porous formation or the representation of the porous formation. A further function includes modelling the permittivity and conductivity measures to generate a first estimation model associated with pore features for the porous formation, so that the first estimation model can be used to estimate or predict a first petrophysical characteristic of a downhole rock formation.

In at least one embodiment, a method and a system for a wellbore operation is disclosed. In at least one embodiment, such a method may be performed in part as functions in a system including at least one processor and memory comprising instructions that when executed by the at least one processor cause the system to perform the functions. Such steps of a method or such functions include determining dielectric property values for a plurality of porous samples and obtaining structural property values for the plurality of porous samples. A further step or function is for generating a model for petrophysical property values of the plurality of porous samples by relating the dielectric property values and the structural property values. Furthermore, a step or function herein includes measuring, using a dielectric sensor, a rock formation dielectric property value of a downhole rock formation. A step or function for determining a rock formation petrophysical property value is performed, for the downhole rock formation, using the model and the measured rock formation dielectric property value. The method or function supports or includes performing the wellbore operation based at least in part on the rock formation petrophysical property value.

BRIEF DESCRIPTION OF THE DRAWINGS

Various embodiments in accordance with the present disclosure will be described with reference to the drawings, in which:

FIG. 7 illustrates a workflow and associated representations of providing a third estimation model using one or more of parts of the first estimation model and second estimation model, according to at least one embodiment;

DETAILED DESCRIPTION

Figure 1:
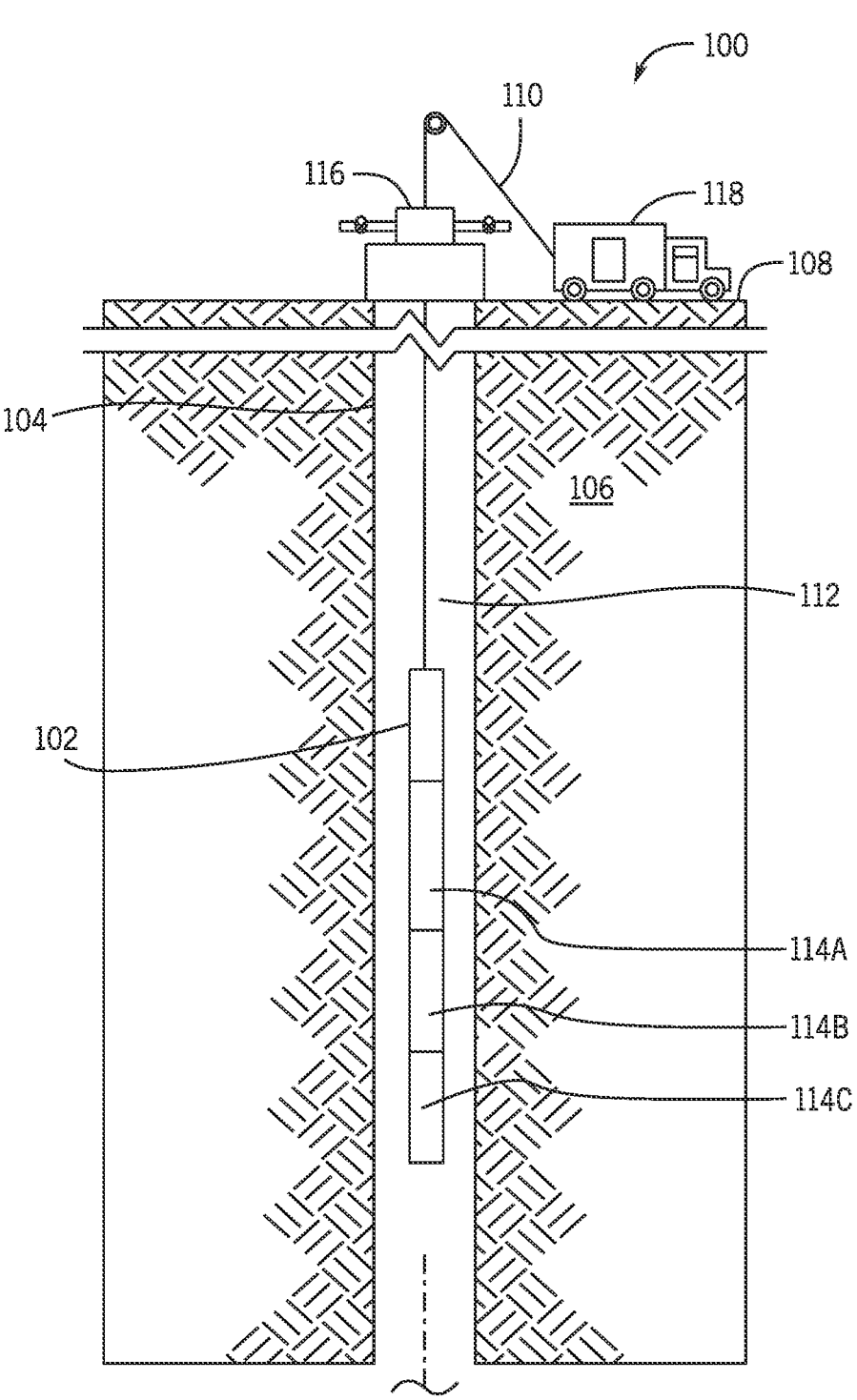
FIG. 1 illustrates an example environment subject to improvements of at least one embodiment herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein. In at least an aspect, the present disclosure is to a system and a method for analysis of a porous media, such as downhole rock formations using porous samples that are representations or artificially-produced porous samples. A system and method herein generate relationships between measurements from applied signals and petrophysical characterizations of such porous samples, so that such relationships can be used to estimate at least permeability and Archie's texture parameters of downhole rock formations.

In at least one embodiment, a system and method herein can address such deficiencies raised and noted throughout herein by including a downhole tool having one or more subsystems (such as physical or simulation subsystem) for application of electrical signals, air medium-based signals, and a fluid-based physical and simulation subsystem. In at least one embodiment, modelling porous formations may be used with random or initial porosity values to find relationships or associations between petrophysical properties in a test or training environment, which relationships or associations can be then used with partial petrophysical properties to determine at least permeability and Archie's texture parameters for downhole rock formations of a production environment. Such models may include equations, functions, and/or data analytics models that may include representations of a downhole rock formation.

In at least one embodiment, a typical size of a porous sample or its representation may be between 1 $mm^3$ to 1 $cm^3$. Electrical signals may be provided by a resistivity device, while air medium-based signals may be provided by an NMR device and fluid-based testing may be provided by a fluid sampling device. In at least one embodiment, a fluid sampling device may take fluid samples downhole by contacting the downhole rock formation (such as a borehole wall) and sucking a fluid sample from the downhole rock formation into the fluid sampling device for analysis and formation pressure measurement.

In at least one embodiment, a system and method herein can enhance a determination of petrophysical properties of downhole rock formations from at least one an air wave-based subsystem (such as, NMR-based subsystem) by an electrical subsystem (such as, a subsystem capable of dielectric measurements). Petrophysical properties may include permeability, Archie's texture parameters (m & n) (also referenced herein as Archie's parameters). In at least one embodiment, such properties may be affected by pore structures within a downhole rock formation.

The air wave-based subsystem may be a wireline NMR device or a logging-while-drilling NMR device included in a bottom hole assembly (BHA) in a drill string. An NMR device includes a permanent magnet to polarize a surrounding earth formation and an electromagnetic transmitter transmitting an electromagnetic wave into the surrounding earth formation. The NMR device measures NMR responses from the earth formation in form of spin echoes. The measured NMR responses enable determination of NMR relaxation times (longitudinal relaxation time T1 and transverse relaxation time T2).

An electrical subsystem may be a wireline resistivity device or a logging-while-drilling resistivity device that is also referred to herein as a dielectric sensor. Such a device is adapted to make dielectric measurements, including an induction-type propagation measurement in the downhole rock formation. Such a resistivity tool includes at least one transmitter antenna and at least one receiver antenna. The at least one transmitter antenna and the at least one receiver antenna may be oriented parallel or may be oriented angled to each other. A position of the transmitter antenna may be based in part on a magnetic moment of the transmitter antenna that it is oriented parallel to a longitudinal axis of the dielectric sensor, of the borehole, and of the drill string.

Further, magnetic moment of the transmitter antenna may be oriented angled to the longitudinal axis of the borehole and to the drill string. In at least one embodiment, such an angle may be a transverse angle (such as 90 degrees). A transmitted electromagnetic wave (e.g., a radio frequency signal) propagates from the dielectric sensor into the downhole rock formation and is received by the receiver antenna. The transmitted and received electromagnetic wave may have various frequencies (multi-frequency measurements). The frequency range of the dielectric sensor may be between 10 MHz and 2 GHz. In at least one embodiment, dielectric measurements either performed in a laboratory or downhole in a wellbore may be made at multiple frequencies, such as 35 MHz, 84 MHz, 200 MHz, 400 MHz and 1 GHz. In at least one embodiment, therefore, this process represents a step for determining dielectric property values for a number of porous samples using multiple frequencies to provide frequency-dependent dielectric property values for individual ones of the dielectric property values for the porous samples.

In at least one embodiment, such dielectric property values may be determined in a laboratory process and may not be limited to specific frequencies and may be made at every suitable frequency. In at least one embodiment, such dielectric property values may be determined from one or more simulations of porous sample or a downhole rock formation. Further, attenuation and phase shift of a wave from a receiver antenna may be measured as part of a process herein. The attenuation and phase shift from a receiver antenna may be referenced to a wave's amplitude for a single transmitter antenna used or to one of a number of waves' amplitudes in embodiments of more than one transmitter antenna.

Alternatively, in at least one embodiment, attenuation and phase shift may be referenced to another receiver antenna's attenuation and phase shift. This may be the case for more than one receiver antennas. From a determined attenuation and/or the phase shift, dielectric permittivity, resistivity, and/or formation conductivity can be calculated. These properties are also referred to herein as dielectric response or dielectric properties. Reference to formation conductivity or conductivity is used herein interchangeably with resistivity as these are relative terms, such as by a reciprocal relationship.

In at least one embodiment, structural properties of downhole rock formation, such as the pore connectivity values or pore connectivity index values (PCI values) may be associated or related with multi-frequency dielectric measurements (such as, permittivity and conductivity and/or resistivity) and can enhance determination of permeability and of Archie's parameters. In at least one embodiment, measurements may be made on a surface or ground-level (such as, at a laboratory) and/or subsurface level (such as, using downhole logging tools on a string in a downhole environment). Measurement of a dielectric property of a porous sample, at multiple frequencies, provides a plurality of frequency dependent porous sample dielectric property values.

Further, air wave-based subsystems, such as NMR-based subsystem or even a computer tomography (CT)-based subsystem, can be used to provide measurements associated with pore size distribution of a downhole rock formation and/or a porous sample. CT scans or magnetic resonance measurements and/or nuclear magnetic resonance tomography (MRT) scans may be used to determine a two-dimensional (2D) or three-dimensional (3D) digital representation of the downhole rock formation. In at least one embodiment, therefore, a method step herein includes determining PCI values using one of a 2D or a 3D digital representation of the porous sample. A digital representation may be also referred to herein as a representation. In at least one embodiment, a digital representation of a downhole rock formations may be obtained by capturing images, such as a photo (also referred to as an optical method), or by utilizing a grain model.

Petrophysical properties (such as permeability and Archie's parameters m and n) of the porous sample may be determined either using digital representations to simulate the petrophysical parameter of the porous sample or using measurement devices (e.g., laboratory permeability tests, a NMR spectrometer, or water saturation tests). Electrical subsystems, with its multi-frequency dielectric property values, can be used to then provide one or more values for a structural property of a porous sample, such as pore connectivity index (PCI) values. In at least one embodiment, integrating two measurements (such as dielectric property values and structure property values) can improve accuracy of a process for determining petrophysical properties of a porous medium.

In at least one embodiment, a process for determination of petrophysical properties from a modelling porous formation or sample may be extended to or utilized in a downhole rock formation for estimating petrophysical properties such as permeability and Archie's texture parameters. In at least one embodiment, structural properties of a downhole rock formation include pore connectivity or a measure of a pore connectivity such as a pore connectivity index, tortuosity, pore size distribution, pore throat size (pore throat size distribution) and cementation factor.

In at least one embodiment, a first estimation model is generated that provides an equation, a function, or data analytics models for the determined structural property values of the porous samples, which varies with the frequency of the multi-frequency dielectric property values. The first estimation model is represented by first estimation model parameters. The first estimation model parameter values are such that they enable a fit for frequency-dependent dielectric property values of the first estimation models. At least one of first estimation model parameter relates the pore connectivity or pore connectivity indices of the porous samples with dielectric property values. The pore connectivity for each porous sample may be determined by using the representation of the porous sample.

A second estimation model may provide an equation, a function, or data analytics models to relate or associate PCI values with the dielectric property values (such as for permittivity and conductivity/resistivity). In at least one embodiment, pore size distribution of a downhole rock formation may be related to or associated with NMR measurements of an (NMR)-based subsystem.

A third estimation model uses NMR pore size distribution or NMR partial porosities to relate the PCI values provided by the second estimation model to at least one petrophysical property value of the porous sample, such as permeability values. The third estimation model may provide an equation, a function or data analytics models to relates or associates a petrophysical property with the PCI values determined using the second estimation model. In at least one embodiment, the third estimation model uses pore size distributions (or partial porosities) to relate PCI values to a permeability. Another petrophysical property may be Archie's parameters (such as, m and n parameters), which may be determined from further estimation models providing equations, functions, and/or data analytics models that relate or associate such parameters with pore size distribution and one or more PCI values.

The estimation models may be combined to one estimation model for calculating the petrophysical property value directly from a dielectric property value. In at least one embodiment, the isolated porosity of the porous sample may be determined instead of the PCI. The second estimation model then relates the dielectric property value and the isolated porosity. The petrophysical property may then be determined using the third estimation model and the isolated porosity. In at least one embodiment, tortuosity of the porous samples may not be required to determine the petrophysical property. The tortuosity can be determined based on the representations of the porous samples only with a low accuracy while the pore connectivity or the isolated porosity can be defined with much higher accuracy. In at least one embodiment, a data-based model, such as machine learning model, may be utilized to determine from the determined dielectric property values and the determined PCI value the petrophysical property.

The above-referenced equations, functions, and/or data analytics models may be estimation models that associate or relate permeability of a downhole rock formation to pore size distribution (or partial porosities) and PCI. To build the third estimation model, the permeability may be measured and/or calculated from modelled porous formations or samples or their representations, such as digital representations from a simulation or a CT image. The downhole rock formation or modelled porous formation or samples, therefore, may have different PCI values.

Pore size distribution and PCI values may be analyzed from either one or both of measured and simulated NMR information and from dielectric response to electrical signals (such as electromagnetic signals) applied to one or more of the downhole rock formation. Measured or simulated dielectric responses provide the dielectric property values described herein. Furthermore, pore size distribution and PCI value may be also determined from an analysis of the representations of the downhole rock formation. Equations may be generated as part of estimation models and enable a relationship or association (such as, correlation) between the permeability, the pore size distribution, and the PCI value(s) for a downhole rock formation.

In at least one embodiment, additional estimation models' equations relate or associate Archie's parameters (such as, m and n parameters) to pore size distribution and to PCI value(s). A dielectric property value (such as permittivity or dielectric constant, and conductivity or resistivity) can be measured and/or determined from downhole rock formation or their representations, where the downhole rock formation or their representations have various PCI. Measurements (from physical porous formations) and/or simulations (from representations of downhole rock formation) may be conducted at various water saturations. Furthermore, Archie's parameters may be determined from the measurements and/or the simulations. A fourth estimation model can include equations that associate or relate (such as, correlate) Archie's parameters to water saturation and to PCI values that are further related to or associated with dielectric property values within the fourth estimation model.

In at least one embodiment, permeability is a property of a downhole rock formation that may be associated with oil and gas production rates. Archie's texture parameters (such as, m and n parameters) may be components (such as exponential values) used to calculate oil reserves in a reservoir associated with the downhole environment. A system for analysis of a downhole rock formation may be used to generate estimation models in the oil and gas industry by relating or associating permeability and Archie's parameters, among other features. In at least one embodiment, such features may be applied to a core, an artificially-produced porous sample, a well-log, a downhole rock formation, or geo-physical data.

In at least one embodiment, pore structure of downhole rock formations having carbonates, may be complex. Reliable and accurate estimation of permeability and Archie's parameters can be challenging to generate. A methodology described herein enhances petrophysical properties determination from NMR and multi-frequency dielectric property values, which then contributes to information for pore connectivity of the porous formation.

In at least one embodiment, such information for pore connectivity of the downhole rock formation or sample may be then used to estimate pore connectivity of a downhole rock formation. In at least one embodiment, such estimation may be a prediction of a measure for pore connectivity, for a downhole rock formation, that is based in part on at least some input obtained from the downhole rock formation being within an equation or function fitted to prior similar inputs from porous samples (such as simulated or artificially-produced porous samples or representations). A measure for pore connectivity may be the pore connectivity index (PCI). Other measures for pore connectivity may be used as well.

In at least one embodiment, porous formations have pore-space geometry and surface wettability that, in turn, affects permeability, fluid distribution, and Archie's parameters of a porous formation. Furthermore, these features are aspects of a reservoir characterization used to describe the downhole rock formation taken as representative of a reservoir. Structural parameters such as isolated porosity and pore connectivity of the downhole rock formation may be significant scale-invariant factors that can be used to determine storage and flow capability of a porous formation.

As such, there may be at least two aspects to such a system and method. A first aspect is a modeling aspect, where different estimation models (having functions, equations, or models) is prepared. The system and method herein can therefore provide different estimation models. A second aspect is an estimation or prediction aspect, where a measure or a value for an estimated or predicted pore connectivity or permeability may be provided for a downhole rock formation different from that used in the first aspect. The downhole rock formation can be analyzed for some features that may fit within the different estimation models to provide at least an estimated PCI value from PCI values of the different estimation models.

In at least one embodiment, the downhole rock formation can be analyzed for some features that may fit within the different estimation models to provide at least an estimated permeability measure or value from permeability values of the third model. Based at least in part on an estimated permeability value, which is a rock formation petrophysical property value determined using a combination of the estimation models and a measured rock formation dielectric property value, an operation action may be performed, in accordance with at least one embodiment. Such an operational action may include one or more of changing a well trajectory, controlling a steering device (geo-steering), sending a downlink, defining a completion plan, defining a production zone, defining a depth for well screens, or creating a downhole formation log. Further, a geo-steering operation may be performed in a fully-automated fashion without interference from a human being or without interference from the surface.

In at least one embodiment, FIG. 1 illustrates an example environment 100 subject to improvements described herein. A system, such as for analysis of pore connectivity and permeability of downhole rock formation using permittivity and conductivity from electrical signals supported by other subsystems, may include one or more downhole and/or platform-based tools 102. In at least one embodiment, a platform-based tool may be above terrain surface 108 (of terrain or downhole rock formation 106) or above water surface.

In at least one embodiment, such a downhole and/or platform-based tool 102 may be part of a string 112 of tools, which may include other components utilized for wellbore operations. Such components may include a drill rig or a logging service truck 118, a depth tracking system, a mud pump, and a bottom hole assembly (BHA). In at least one embodiment, a BHA can include various downhole devices, such as an measurement-while-drilling device to measure an orientation of a downhole component (such as an azimuth or inclination), various formation evaluation devices (such as gamma device, a density device, a resistivity device, an NMR device, a formation sampling device), a mud motor, a rotary steering system, and a drill bit.

In at least one embodiment, a string 112 may include other tools 114A-114C than components or an entire fast in-field chromatography system. In at least one embodiment, such tools may be part of sensors, measurement devices, communication devices, and the like. In at least one embodiment, a string 112 may include one or more tools to enable at least one of a logging operation (such as mud-gas logging, formation density logging, formation resistivity logging, formation porosity logging), for drilling operation, for perforating operation, or for well intervention. In at least one embodiment, nuclear logging tools (for formation density), fluid sampling tools, formation resistivity tools, formation porosity tools, NMR tools, acoustic tools, and core sampling devices may be also used in a string 112. In at least one embodiment, such one or more tools may include part of or a complete subsystem to perform functions described throughout herein.

In at least one embodiment, perforating operations may include ballistic devices being lowered into a wellbore 104 to perforate casing or the formation. In at least one embodiment, well interventions may include operations relating to analysis of one or more features of a wellbore 104, followed by performing one or more tasks in response to at least one feature. In at least one embodiment, one or more features may include data acquisition, cutting, and cleaning. As such, in at least one embodiment, a string 112 may refer to a combination of one or more tools lowered into a wellbore 104. In at least one embodiment, passive devices may also be included, such as centralizers or stabilizers. In at least one embodiment, tractors may be provided to facilitate movement of a string 112.

In at least one embodiment, power and/or data conducting tools (such as data transmission tools or telemetry tools) may be used to send and receive signals and/or electrical power. In at least one embodiment, sensors may be incorporated into various components of a string 112 and may be enabled to communicate with a surface (platform) or with other string components. In at least one embodiment, such communication may be via a cable 110, via mud pulse telemetry, via wireless communications (such as electromagnetic telemetry or acoustic telemetry), and via wired drill pipe, in a non-limiting manner. In at least one embodiment, it should be appreciated that while embodiments may include a wireline system, a rigid drill pipe, coiled tubing, or any other downhole exploration and production methods may be utilized with at least one embodiment herein.

In at least one embodiment, an environment 100 includes a wellhead assembly 116 shown at an opening of a wellbore 104 to provide pressure control of a wellbore and to allow for passage of equipment into a wellbore 104. In at least one embodiment, such equipment may include a cable 110 and a string 112 of tools. In at least one embodiment, a cable 110 is or may include a wireline that is spooled from a service truck 118. In at least one embodiment, a cable 110 may extend to an end of a string 112. In at least one embodiment, during operation, a cable 110 may be provided with some slack as a string 112 is lowered into a wellbore 104 to a predetermined depth.

In at least one embodiment, fluid may be delivered into a wellbore 104 to drive or assist in movement of a string 112. In at least one embodiment, this may be a case where gravity may not be sufficient to assist, such as in a deviated wellbore. In at least one embodiment, a fluid pumping system may be provided at a surface 108 to pump fluid from a source into a wellbore 104 via a supply line or conduit to clean the wellbore 104 by transporting formation cuttings and/or to stabilize the wellbore 104. In at least one embodiment, control of a rate of travel of a downhole assembly and/or control of tension on a wireline 110 may be provided by a winch on a surface 108. In at least one embodiment, such a winch system may be part of a service tuck 118. In at least one embodiment, a combination of fluid flow rate and tension on a wireline 110 can contribute to a travel rate or rate of penetration of a string 112 into a wellbore 104. In a drilling operation the string 112 may be lowered using a derrick and a hook. The derrick may include a rotary table or a top drive system to rotate the drill string.

In at least one embodiment, a provided cable 110 may be an armored cable that includes conductors for supplying electrical energy (power) to downhole devices and communication links for providing two-way communication between a downhole tool and surface devices. In at least one embodiment, tools such as tractors, may be disposed along a string 112 to facilitate movement of such a string 112 into a wellbore 104. In at least one embodiment, a string 112 may be retrieved from a wellbore 104 by reeling a provided cable 110 upwards using such a service truck 118. In at least one embodiment, logging operations may be performed as a string 112 is brought to a surface 108.

In a drilling operation, logging operation may be performed while the wellbore is drilled and the string that is capable of drilling is progressing into the wellbore. The string may rotate during the logging operation. The BHA in such a string may be powered by a downhole battery or alternatively by a downhole generator using a turbine. The downhole generator may transform energy stored in flowing downhole fluid into electrical energy, in at least one embodiment.

In at least one embodiment, a system of a downhole tool 102 can include a wireline system for analysis of a downhole rock formation that is entirely in the downhole environment or partly in the downhole environment and partly on the surface. In at least one embodiment, wireline logging tools are able to evaluate a downhole rock formation in a downhole environment or is able to retrieve samples or production-quality porous formations for a surface analysis of such downhole rock formation.

Figure 2:
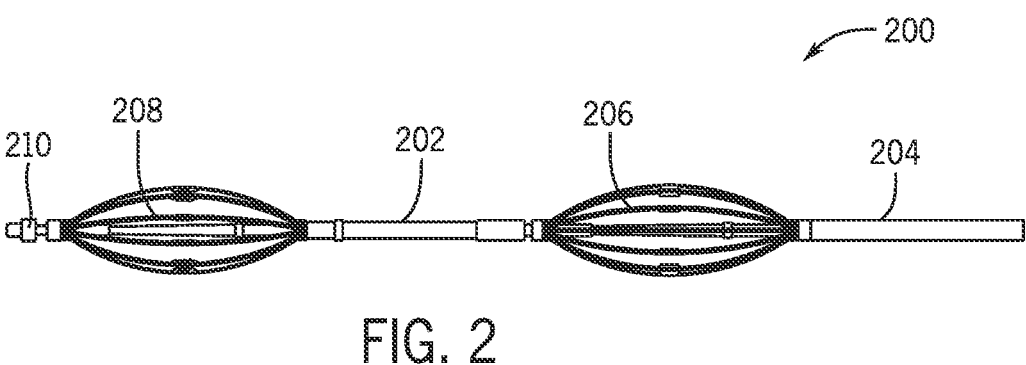
FIG. 2 illustrates a downhole tool that can include a wireline system for analysis of a downhole rock formation that is partly in the downhole environment and partly on the surface, or fully in the downhole environment.

FIG. 2 illustrates a downhole tool 200 that can include a wireline system for analysis of a downhole rock formation that is partly in the downhole environment and partly on the surface, or fully in the downhole environment. FIG. 2 may be taken as an illustration of a test tool 200 subject to improvements disclosed herein, in accordance with various embodiments. A tool 200 can include a downhole instrument 202 with compartments for a temperature sensor 204, a spinner array 206, a wireline system 208 for analysis of a downhole rock formation, and resistance array 210. At least some of these components may be used to collectively provide capability to perform analysis of a downhole rock formation from a downhole application. A wireline system 208 for analysis of a downhole rock formation may be coupled to an above-ground or surface subsystem, such as at least one processor executing instructions from a memory to perform multiple functions, for instance. As such, the wireline system may be a subsystem that works with the above-ground or surface subsystem.

In at least one embodiment, one or more processors may be used to process acquired downhole data and to apply one or more of the estimation models (such as a first, a second, or a third estimation model). In at least one embodiment, the one or more processors may be located downhole in the wireline system or may be located uphole in a service truck or at any other surface location, including in a remote location in town. In a drilling operation, when downhole data is acquired while drilling, the one or more processors may be located either downhole in the bottom hole assembly or at surface in a surface unit.

In at least one embodiment, one or more of the estimation models may be applied at surface or downhole while logging or drilling. One or more of the estimation models may be stored in a non-volatile memory as instructions to be executed by the one or more processors, the combination of which is either at the earth surface or in a downhole tool (BHA or wireline tool). Data may be communicated between downhole and uphole environments by a wireline, wired pipe, mud pulse telemetry, or any other telemetry method. The data may include dielectric property values (such as permittivity, conductivity, resistivity), dielectric raw data (such as attenuation, phase shift), petrophysical properties (such as permeability, Archie's parameters), and NMR parameter (such as pore size distribution, partial porosities, total porosity).

Figure 3:
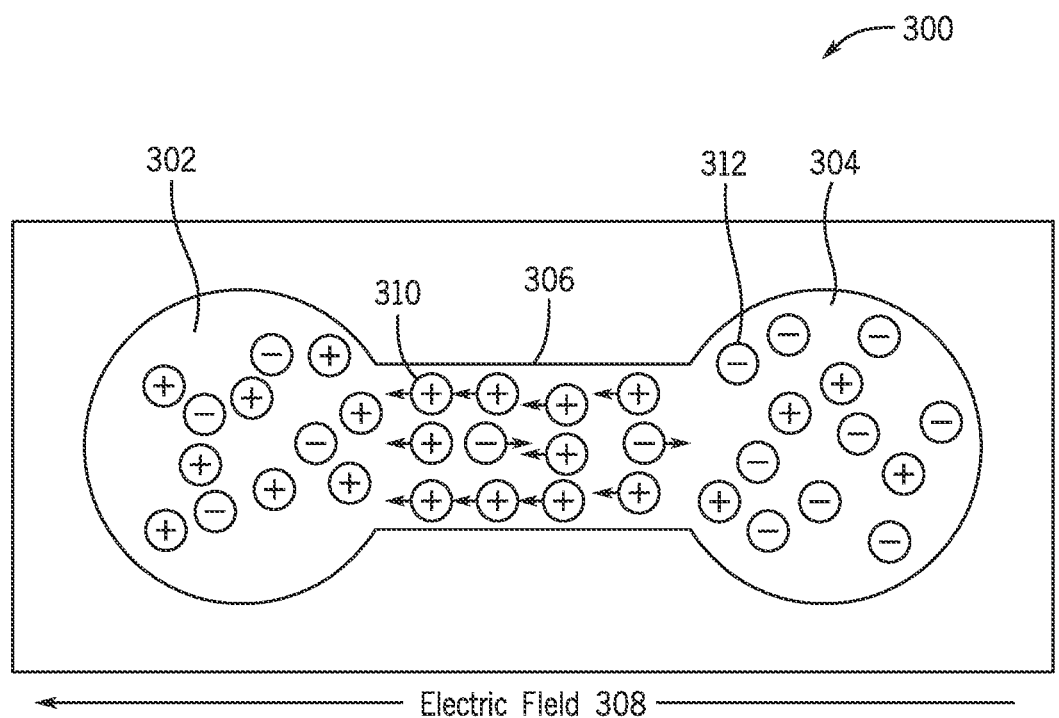
FIG. 3 illustrates porous aspects associated with pore connectivity that may be addressed by a system for analysis of a downhole rock formation, in at least one embodiment.

FIG. 3 illustrates porous aspects 300 associated with pore connectivity that may be addressed by a system for analysis of a downhole rock formation, in at least one embodiment. In FIG. 3, dielectric polarization is enhanced due to narrow pore throats 306 between pores 302, 304. Such aspects 300 result in an accumulation of cations 310 or depletion of anions 312 on one side of a throat 306 that is closer to a first pore 302 and result in a deficit on another side of a throat 306 that is closer to a second pore 304.

A network of void space of a downhole rock formation may include such connected pores 302, 304 and may also include isolated pores. When pores are isolated from a network of a void space, in a downhole rock formation, there may be an increase in a tortuous path of a fluid flow. In at least one embodiment, this results in low permeability of a downhole rock formation. Separately, however, tortuous flow channels may enhance interfacial polarization due to such accumulations of electric charges at some solid-void space interface when a downhole rock formation is under an external electric field 308.

When one or more throats 306 connect two or more pores 302, 304, and when such throats 306 are narrow, positive electric charges (cations) 310 may accumulate at one end of a throat 306 and may be at a deficit at another end. This may result in an electrically concentration gradient, as illustrated in FIG. 3. A concentration gradient can impose an electric dipole moment across a pore throat 306. In at least one embodiment, such an electric dipole moment can contribute to an enhancement of dielectric permittivity of a downhole rock formation. Such an enhancement of dielectric permittivity may be beneficially used to characterize pore connectivity of a downhole rock formation.

In at least one embodiment, FIGS. 4A-4D illustrate aspects 400, 490 of dielectric constant (representing permittivity) and conductivity from multi-frequency dielectric property values, used along with other aspects 450, 470 towards providing a first estimation model for a measure for pore connectivity. The first estimation model is based in part on a modelling or artificially-produced porous sample. For a first estimation model, dielectric constant (such as relative permittivity or generally, permittivity for the disclosure herein) may be taken as a measure of an electric polarizability of a material under an external electric field, such as field 308 of FIG. 3. A material used here is with reference to a downhole rock formation under study.

The dielectric constant (also referred to and understood for aspects herein as the permittivity or relative permittivity) is a measure of the electric polarizability of a material under an external electric field. Relative permittivity $\varepsilon_r(\omega)$ may be defined as permittivity of a material relative to permittivity of a vacuum:

$$\varepsilon_r(\omega) = \frac{\varepsilon(\omega)}{\varepsilon_0}.$$
Equation (1)

In Equation (1), $\varepsilon(\omega)$ is a complex frequency-dependent permittivity of a material, $\varepsilon_0$ is vacuum permittivity, and w is an angular frequency, where $\omega=2\pi f$, where f is a frequency of an external electric field.

Relative permittivity is a complex function having the real and imaginary components and can be expressed as:

$$\varepsilon_r(\omega) = \varepsilon_r'(\omega) - i\frac{\sigma(\omega)}{\omega\varepsilon_0}.$$
Equation (2)

In Equation (2), i is an imaginary number and $\sigma(\omega)$ is an electrical conductivity (having unit S/m or Siemens per meter). A real component of relative permittivity in Equation (2) may decrease with an increase in frequency. Electric conductivity can increase with an increase in frequency. Dielectric conductivity may be negligible if conductivity of a material is low, such as less than ~10 mS/m. This may be the case for many geologic materials, including those found in downhole rock formation. A dielectric constant may be, therefore, a real component of dielectric permittivity. As such, dielectric permittivity or dielectric constant is taken as representative of a real component of relative dielectric permittivity from Equation (2), for the downhole rock formation used herein.

Pore size distribution, pore spatial distribution, and pore connectivity may be other structural properties affecting petrophysical properties of downhole rock formation, including of reservoir rocks, along with other properties, such as permeability, electrical conductivity, and permittivity. When pores are disconnected from a network of a material having pore spaces, there is an increase in a tortuous path of fluid and electric current flow. This results in low permeability, low electrical conductivity, and high permittivity of a material, such as a downhole rock formation.

A pore connectivity index (PCI) is taken herein as a measure of pore connectivity of a porous formation. PCI may be addressed in different manners, including, as a ratio of connected porosity ($\phi_c$) to total porosity ($\phi_t$) of a porous formation:

$$PCI = \frac{\phi_c}{\phi_t}.$$
Equation (3)

PCI may, differently, be addressed as a ratio of permeability of a downhole rock formation in which pores are partially connected ($k_p$) to permeability of a sample in which all pores are fully connected ($k_f$):

$$PCI = \frac{k_p}{k_f}.$$
Equation (4)

PCI may, differently, be addressed as ratio of electrical conductivity of a porous formation in which pores are partially connected ($\sigma_p$) to conductivity of a sample in which all pores are fully connected ($\sigma_f$):

$$PCI = \frac{\sigma_p}{\sigma_f}.$$
Equation (5)

Furthermore, a PCI value is a value that vary between a range from 0 to 1. A PCI value of "1" may indicate that pores in a porous formation are well connected. A PCI value of "0" may indicate that pores in a porous formation are disconnected from each other or connected with very narrow pore throats. A first porous formation with a first PCI may therefore include better connected pores than a second porous formation with a second PCI when the first PCI is more than the second PCI.

Figure 4A:
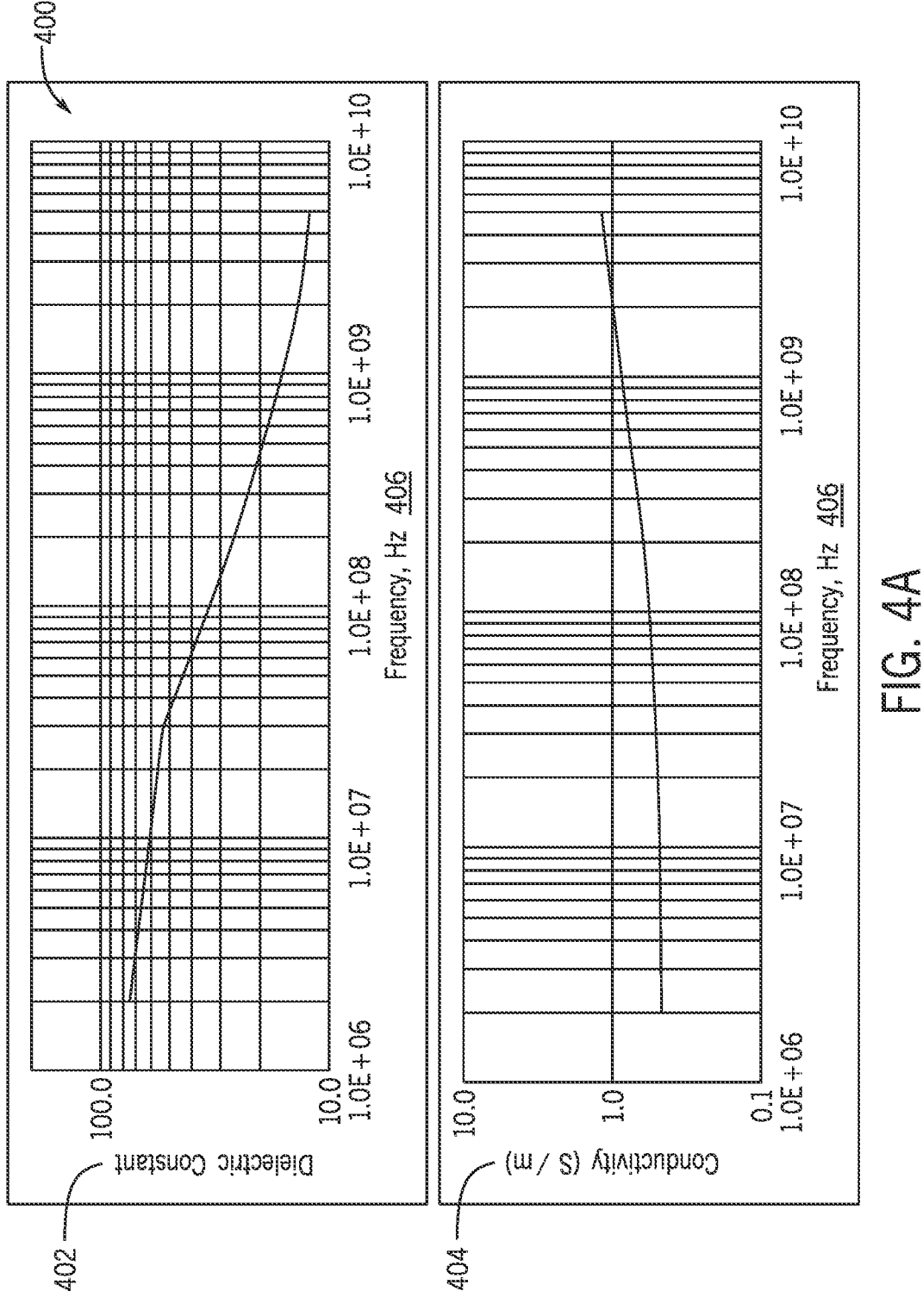
FIGS. 4A-4D illustrate aspects of dielectric constant (representing permittivity) and conductivity from multi-frequency dielectric measurements, used along with other aspects towards providing a first estimation model for pore connectivity and permeability, according to at least one embodiment.
Figure 4B:
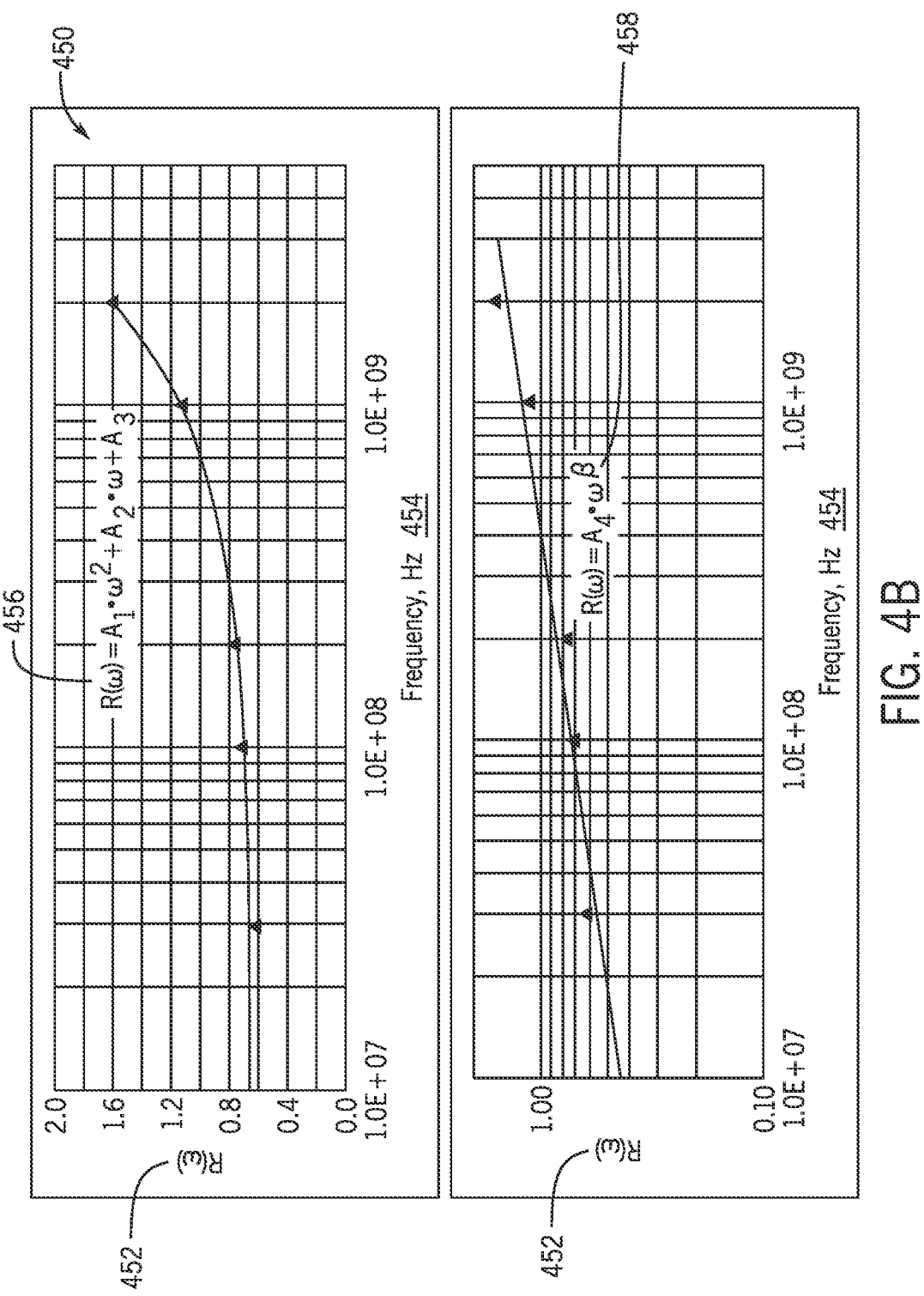
Figure 4C:
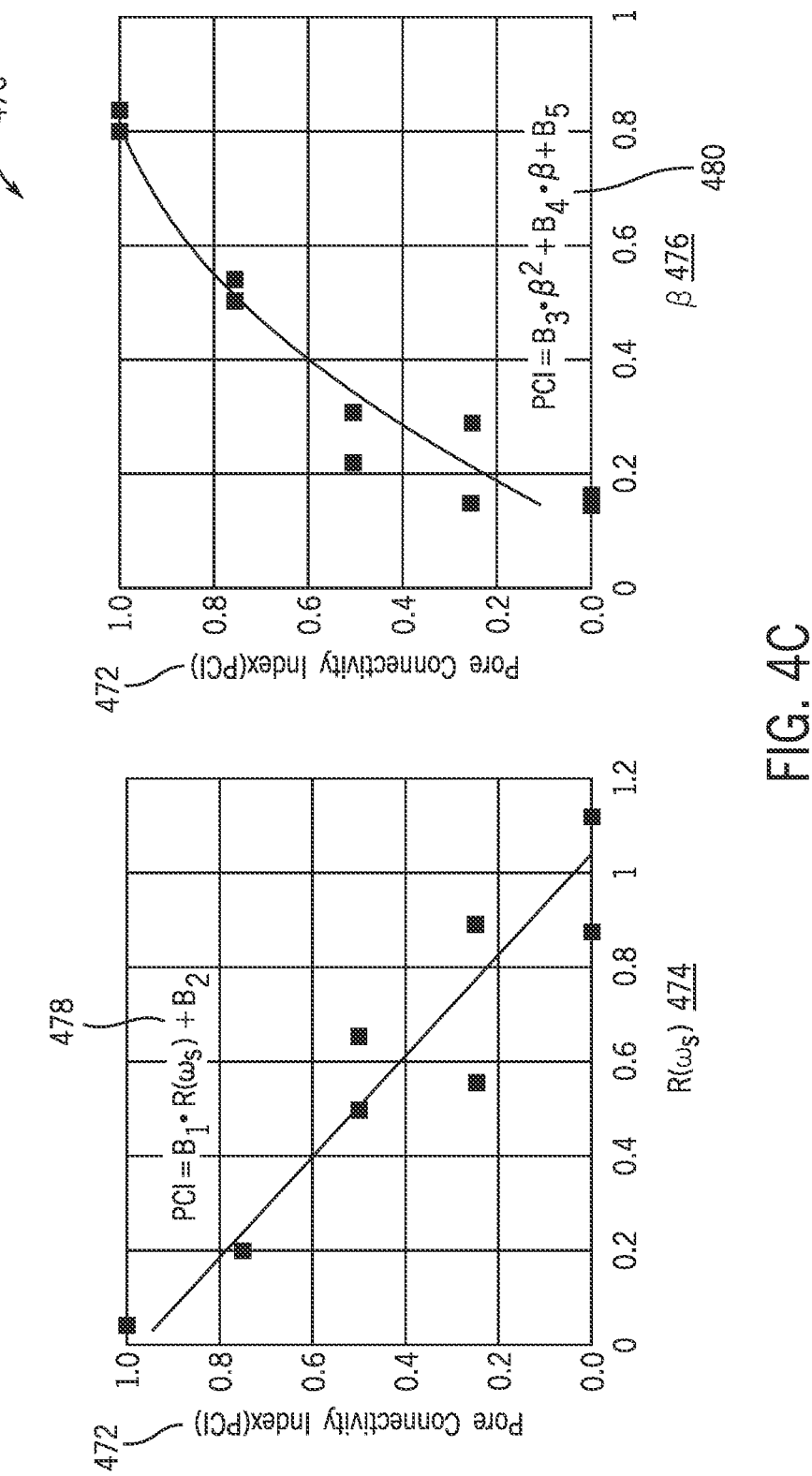

As illustrated in FIGS. 4A-4C, one or more PCI values may be related or associated with multi-frequency dielectric property values, such as permittivity or dielectric constant $$\varepsilon'_r(\omega)$$

402 and conductivity σ(ω) 404, as in Equation (2). As permittivity 402 and conductivity 404 change with frequency and may be determined using modeling porous formations. This may be part of the first aspect (or modeling aspect) to prepare different estimation models (having functions, equations, or models) is prepared. As such, FIGS. 4A-4C represents a method for analysis of a porous formation by providing, using an electrical subsystem, electrical signals for the porous formation. As explained with respect to FIGS. 5A, 5B, however, electrical signals maybe provided for a representation of the porous formation. At least one processor may be used to execute instructions from a memory to cause the at least one processor to determine, using the electrical signals, permittivity and conductivity measures for the porous formation.

Values of $R_m(\omega)$ may be calculated from a function, in which either measured dielectric constant, conductivity, or a combination are used:

$$R_m(\omega) = \text{function}(\varepsilon'_r(\omega), \sigma(\omega)). \qquad \text{Equation (6)}$$

A first estimation model may be Equation (6). Equation (6) represents a step in a method for analysis of a downhole rock formation by modeling the permittivity and conductivity measures in dependence to multiple frequencies used in a multi-frequency dielectric property value to generate a first estimation model associated with pore features for the porous formation. The function of Equation (6), representing at least a part of the first estimation model, may be a polynomial function, power function, logarithmic function, exponential function, a logistic function, or any other suitable function that fits permittivity and conductivity values from modeling porous formations. In at least one embodiment, FIG. 4B illustrates a function R(ω) 452 that is used to fit measured $R_m(\omega)$ of permittivity and conductivity from modeling porous formations.

In FIG. 4B, a quadratic (polynomial) function 456 (Equation (7)) and a power function 458 (Equation (8)), both representing different first estimation models, are illustrated as suitably fitting measured dielectric constant, conductivity, or a combination of both:

$$R(\omega) = A_1 \cdot \omega^2 + A_2 \cdot \omega + A_3 \qquad \text{Equation (7)}.$$

$$R(\omega) = A_4 \omega^\beta \qquad \text{Equation (8)}.$$

In Equations (7) and (8), values for $A_1$, $A_2$, $A_3$, $A_4$ and represent constant values that are determined as suitable to the fit of the Equations. In at least one embodiment, is one of a number of determined first estimation model parameter values to enable a fit for the frequency-dependent dielectric property values of the first estimation models. R(co) is a frequency-dependent and modeled dielectric property value, while $A_1$, $A_2$, $A_3$, $A_4$ and are first model parameters or first model fit parameters. FIG. 4B displays a polynomial or a power function that fits the measured values of $R_m(\omega)$ using a modelling porous formation that has 20% porosity, in which PCI value is 0.5, as an example.

In a similar manner, as in FIG. 4B, FIG. 4C illustrates further functions, forming a second estimation model, to relate or associate the modeled dielectric property value R(co) with a structural property, such as the pore connectivity index by one or more fitting functions 478, 480:

$$PCI = B_1 \cdot R(\omega s) + B_2 \qquad \text{Equation (9)}.$$

$$PCI = B_3 \cdot \beta^2 + B_4 \cdot \beta + B_5 \qquad \text{Equation (10)}.$$

The modeled dielectric property value $R(\omega_s)$ 474 (from Equation (7), first estimation model), at a specific frequency $\omega_s$, and/or a constant β 476 (from Equation (8), also part of the first estimation model) may be related to PCI values 472. $R(\omega_s)$ is referred to herein as a modeled selected frequency porous sample dielectric property or alternatively as a specific dielectric property indicator of a porous sample. The constant β may be a dielectric property indicator exponent. FIG. 4C therefore illustrates a linear function 478 and a polynomial function 480 that fit PCI values relating to $R(\omega_s)$ and β, respectively.

PCI values for a downhole rock formation may be then inferred from the polynomial and/or the power function relating to $R(\omega_s)$ and/or β. $R(\omega_s)$ herein has one or more values for a specific frequency $\omega_s$ and β has one or more constant values (that are not frequency dependent). $B_1$, $B_2$, $B_3$, $B_4$, $B_5$ may be model parameters or fit parameters of the second estimation model. $R(\omega_s)$ and β vary with varying PCI. Each $R(\omega_s)$ and each β represent a specific downhole rock formation with a specific PCI. $R(\omega_s)$ and β depend predominantly from the structural properties of a porous sample or its representation. $R(\omega_s)$ and β depend from a rock type (or a lithology type), such as based in part on carbonate or sandstone rock types. In at least one embodiment, therefore, the second estimation model may be generated based in part on relating the first estimation model parameters (such as β) to the structural property values (such as to $R(\omega_s)$).

In at least one embodiment, the second estimation model is generated by first selecting a frequency of the multiple frequencies and then, determining, for individual ones of a number of porous samples, an individual one of the frequency-dependent dielectric property values at the selected frequency using the first estimation model. A second estimation model is generated based in part on relating the individual one of the frequency-dependent dielectric property values to the structural property values for the number of porous samples.

In at least one embodiment, in the case of values for A1-A4 or values for B1-B5, these values may be found by a minimization of errors between a hypothesis (such as an R(ω) hypothesis or a PCI-hypothesis) using $R_m(\omega)$ over ω values or a hypothesis using PCI over $R(\omega_s)$ or β values, respectively. In at least one embodiment, for the hypothesis, a cost function may be defined and minimization of the cost function may be performed to find appropriate values to correlate $R(\omega_s)$ and ω or to correlate $R(\omega_s)$ or β against the PCI values. An equation in the hypothesis may be a polynomial or power function, and represents part of the first estimation model. A cost function may be a function that measures the performance of a model for given data. The cost function quantifies the error between predicted values and expected values and presents it in the form of at least one real number. A cost function may also be referred to as a loss function or an error function.

Figure 4D:
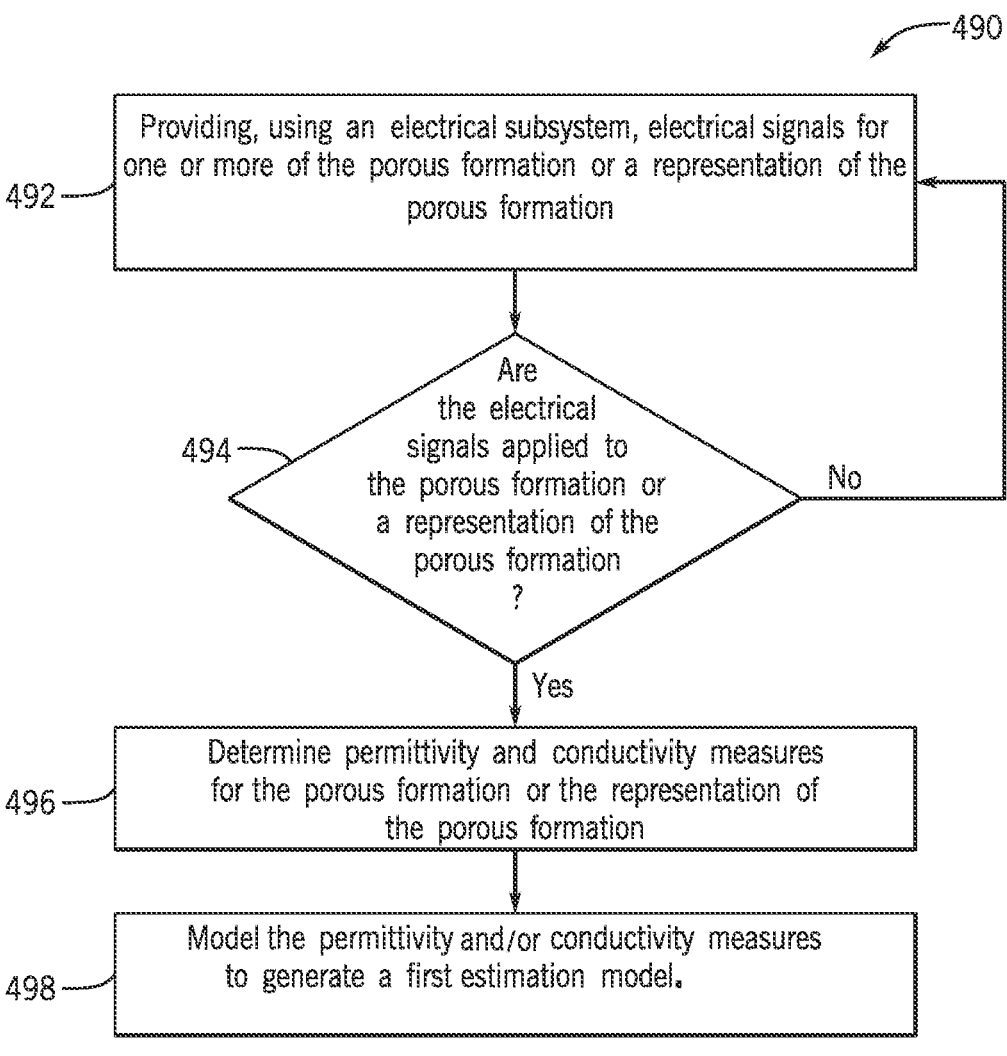

FIG. 4D illustrate aspects of FIGS. 4A-4C in a workflow 490 format. In at least one embodiment, steps 492-498 enable a method for analysis of a porous formation. Step 492 of a method 490 includes providing, using an electrical subsystem, electrical signals (such as electromagnetic signals or radio frequency signals) for one or more of the downhole rock formations (or as discussed with respect to an embodiment in FIGS. 5A, 5B, a representation or a porous sample). The electrical subsystem transmits electrical signals with varying frequencies (such as multiple frequencies).

Step 494 enables verification that electrical signals are applied to the downhole rock formation (or a porous representation or sample). A positive verification allows step 496 to be performed. Step 492 may be repeated on a negative of the verification in step 494. Step 496 is for determining, using the electrical signals, permittivity and/or conductivity measures for the porous formation or the representation of the porous formation. The permittivity and/or conductivity are determined at the multiple electrical signal frequencies. In at least one embodiment, step 494 and one or more subsequent steps may be performed by executing, using at least one processor, instructions from a memory to cause the at least one processor to perform such steps. Step 498 models the permittivity and/or conductivity measures, in dependency to the multiple electric signal frequencies, to generate a first estimation model.

In at least one embodiment, such a first estimation model is within a test or training environment. In at least one embodiment, method 490 may include many intermediate steps or may provide such first estimation model for use with subsequent estimation models (such as a second, a third or a fourth estimation model) prior to being used to estimate or predict permeability and PCI values for downhole rock formations in a production environment using part of petrophysical properties, such as permittivity and conductivity.

In at least one embodiment, the first estimation model is saved to a database of a non-volatile memory. In a later step of the method a first estimation model may be selected, such as using a processor, from a non-volatile memory based in part on at least best matches of a measured dielectric property value of a downhole rock formation to the first estimation model. The first estimation model, as selected, may be used to determine a petrophysical property of the downhole rock formation. The non-volatile memory may also include one of the second estimation model, the third estimation model, and the fourth estimation model. In at least one embodiment, during determining of the petrophysical property of the rock formation one of the first estimation model, the second estimation model, the third estimation model, and the fourth estimation model may be selected from the non-volatile memory.

The selection of a best matching estimation model may include an analytical method step having an analytical function to determine the best matching estimation model. In at least one embodiment, selection of the best matching model may be performed by a neural network or a machine learning program. A non-volatile memory having the one of the first estimation model, second estimation model, third estimation model, and fourth estimation model may be prepared at a surface before a logging run in a wellbore. The dielectric property value in a logging run may be transmitted to the surface to calculate a petrophysical property of the downhole rock formation. In at least one embodiment, a non-volatile memory having one or more of the first estimation model, second estimation model, third estimation model, and fourth estimation model may be saved in a memory of a downhole tool, such as either in a wireline logging tool or in a logging-while-drilling tool. This allows estimation of the petrophysical property of the downhole rock formation in the downhole while logging or during the drilling operation, in real time.

In at least one embodiment, a machine learning or artificial intelligence (ML/AI) algorithm may be trained to use the one or more estimation models to infer that permittivity and conductivity determined for a downhole rock formation is associated with one or more PCI values and with one or more permeability. For example, each of the estimation models described herein provide a hypothesis that may be included within respective functions, equations, or data analytics model generated. As associated cost functions have been determined and minimized, the values associated with the cost functions may be used with the estimation models to train an ML/AI algorithm to infer pore connectivity, permeability, and Archie's texture parameters of porous formations using permittivity and conductivity from electrical signals supported by other subsystems (such as air wave-based and fluid-based subsystems).

In at least one embodiment, multiclass classification may be provided using each estimation model as a class and having a unity output in an output vector. A training set may be established, using the sample or modelling porous formation, and applied electrical signals, air wave-based signals, and fluid-based testing. A one-vs-all logistic regression model may be created using the estimation models generated. The cost function may be generated using the constants (such as model parameters) suitable to the different hypotheses of each estimation model. A gradient descent may be enabled for the cost function. A classifier thus generated is an ML/AI algorithm that can classify, from downhole rock formations, input permittivity, conductivity, NMR T2 values, $R(\omega_s)$, and $\beta$ values as associated or related with certain PCI values, permeability, and Archie's texture parameters.

Figure 5A:
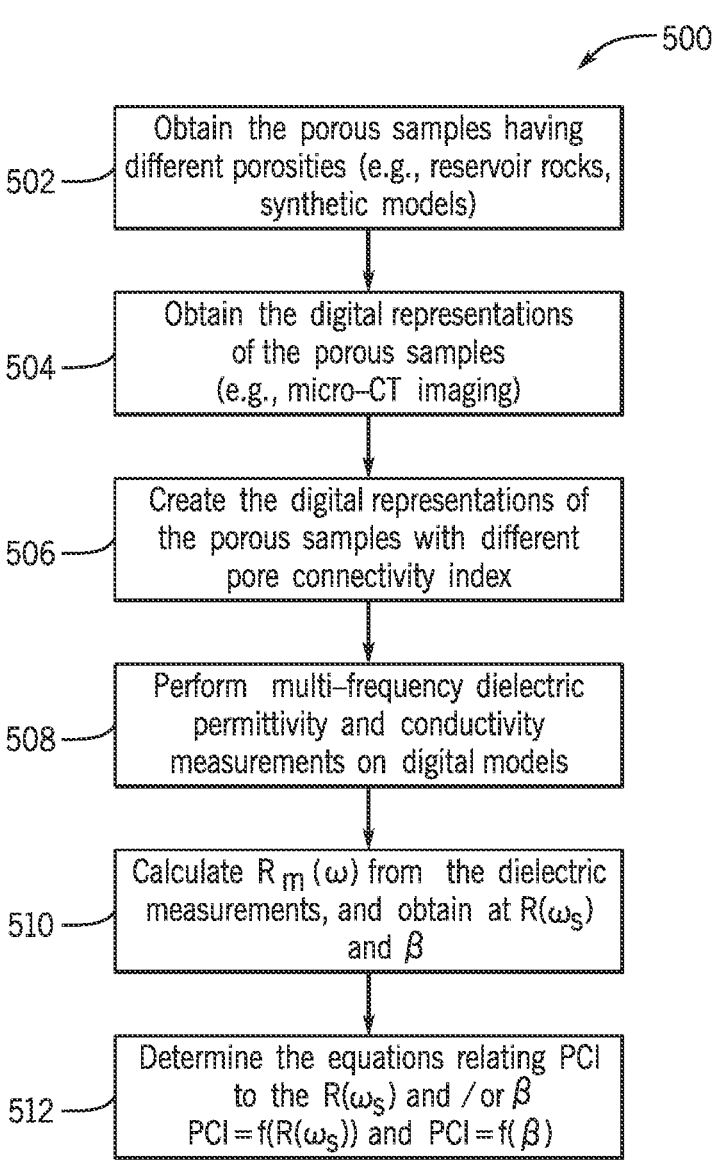
FIGS. 5A, 5B illustrate a workflow and associated representation of providing a first estimation model that relates or associates PCI values with multi-frequency dielectric measurements using a representation of the modeled porous sample or downhole rock formation, in at least one embodiment.

In at least one embodiment, FIG. 5A illustrates a workflow 500 of providing a second estimation model that relates or associates PCI values with $R(\omega_s)$ and $\beta$ from multi-frequency dielectric measurements using a representation of the modelling or physical or artificially-produced porous formation. In at least one embodiment, while a second estimation model may be provided from a modelling porous formation that is a physical or artificially-produced porous formation, another second estimation model may be provided from representations of the physical or artificially-produced porous formation.

Step 502 of method 500 includes obtaining porous formation samples having different porosities. For example, reservoir rocks or synthetic models may be used. As this is a test or training environment, samples of porous formations may be created to suit certain values of permeability and PCI. Step 504 is for obtaining digital representation of the porous sample. In one example, a digital representation is a CT scan (such as, a micro-CT imaging). In an example, such a representation is from an air wave-based subsystem (including, electromagnetic waves (such as, x-ray), NMR (including Magnetic Resonance Tomography (MRT), CT-imaging, or other non-contact systems). Such a subsystem can provide air medium-based signals (x-rays, radio frequency waves, etc.) for one or more of the porous formation. Step 506 is for creating different digital representations from the obtained digital representations. In at least one embodiment, this may be done by modification of the digital representation to include different PCI values. All such digital representations may be referred to as representations herein.

Step 508 is for performing multi-frequency dielectric property value measuring (such as for permittivity and conductivity property values) on the different representations. In at least one embodiment, this step may be performed in a similar manner as discussed with respect to FIGS. 4A-4D, such as steps 492, 494 of FIG. 4D. Step 508 is therefore to determine, using an air-medium-based signals, the representation of the porous formation. Step 510 is for calculating or determining the permittivity and/or conductivity for multiple electrical signal frequencies, in a similar manner as done with respect to step 496 of FIG. 4D, but with a representation instead of a physical or an artificially-produced porous formation. In at least one embodiment, dielectric property values may be simulated or measured in a laboratory based on the representations.

Step 512 is to determine equations that are part of a second estimation model. In at least one embodiment, Step 512 may be like step 498 of FIG. 4D. However, steps 506-512 may be performed within steps 492-498 of FIG. 4D. As such, steps 506-512 may be further features from the features generated in FIG. 4D and may be further narrowing estimation models than the estimation model of FIG. 4D.

Figure 5B:
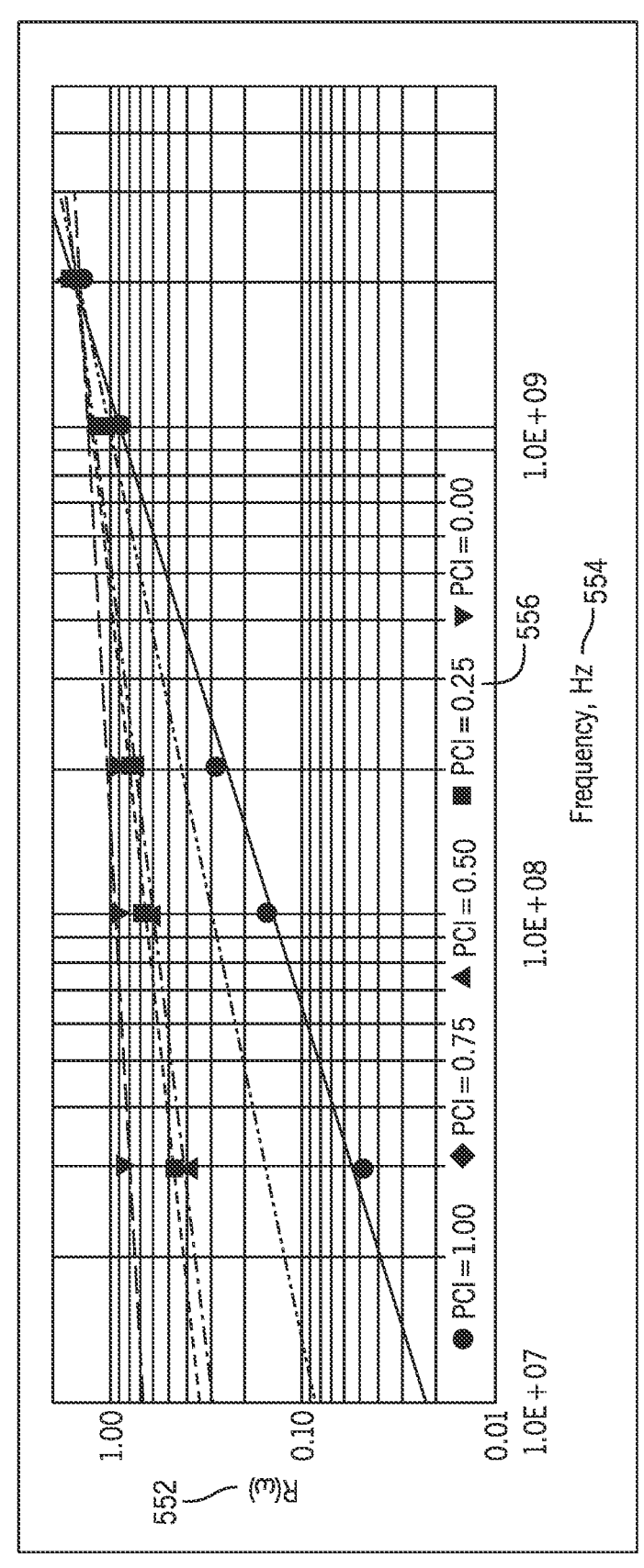

FIG. 5B illustrates plots of R($\omega$) 552, as determined in step 512, as a function of electrical signal frequency 554 (such as frequency values) and PCI values 556, which represents a second estimation model. FIG. 5B illustrates that different PCI values fit with different R($\omega$) 552 and with electrical signal frequencies 554. As such, using a second estimation model in FIG. 5B, PCI values can be determined for downhole rock formations as the function of x, where x=R($\omega_s$) or $\beta$. This may be from the following equations representing a second estimation model:

$$PCI = B_1 \cdot x + B_2 \qquad \text{Equation (11).}$$

$$PCI = B_3 \cdot x^2 + B_4 \cdot x + B_s \qquad \text{Equation (12).}$$

The power and polynomial functions used in Equations (11) and (12) may be second estimation models from which PCI values may be determined based on input R($\omega_s$) or $\beta$ for downhole rock formations.

Furthermore, like in the case of FIGS. 4A-4D, values for B1-B5 may be found by a minimization of errors between a PCI-hypothesis using R($\omega_s$) or $\beta$ against the PCI values. In at least one embodiment, for the PCI-hypothesis, a cost function may be defined, and minimization of the cost function may be performed to find appropriate values to correlate R($\omega_s$) and $\beta$ against the PCI values. An equation in the PCI-hypothesis may be a polynomial or power function and represents part of the second estimation model.

Figure 6A:
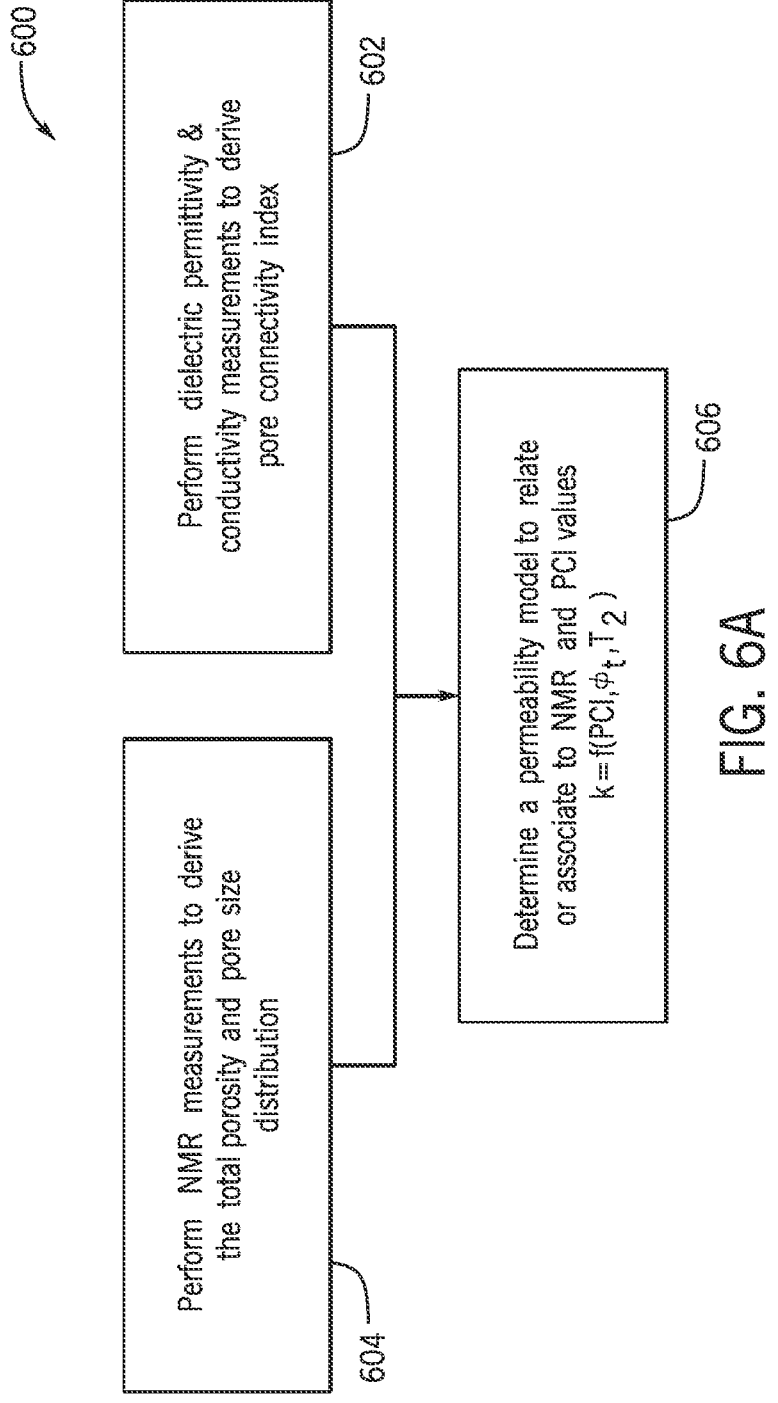
FIGS. 6A-6C illustrates a workflow and associated representations of providing a further models within a second estimation model that now includes permeability of a downhole rock formation using PCI values, such as from FIGS. 4A-4D and/or 5A, 5B, along with NMR measurements that integrates explicitly the PCI values, according to at least one embodiment.
Figure 6B:
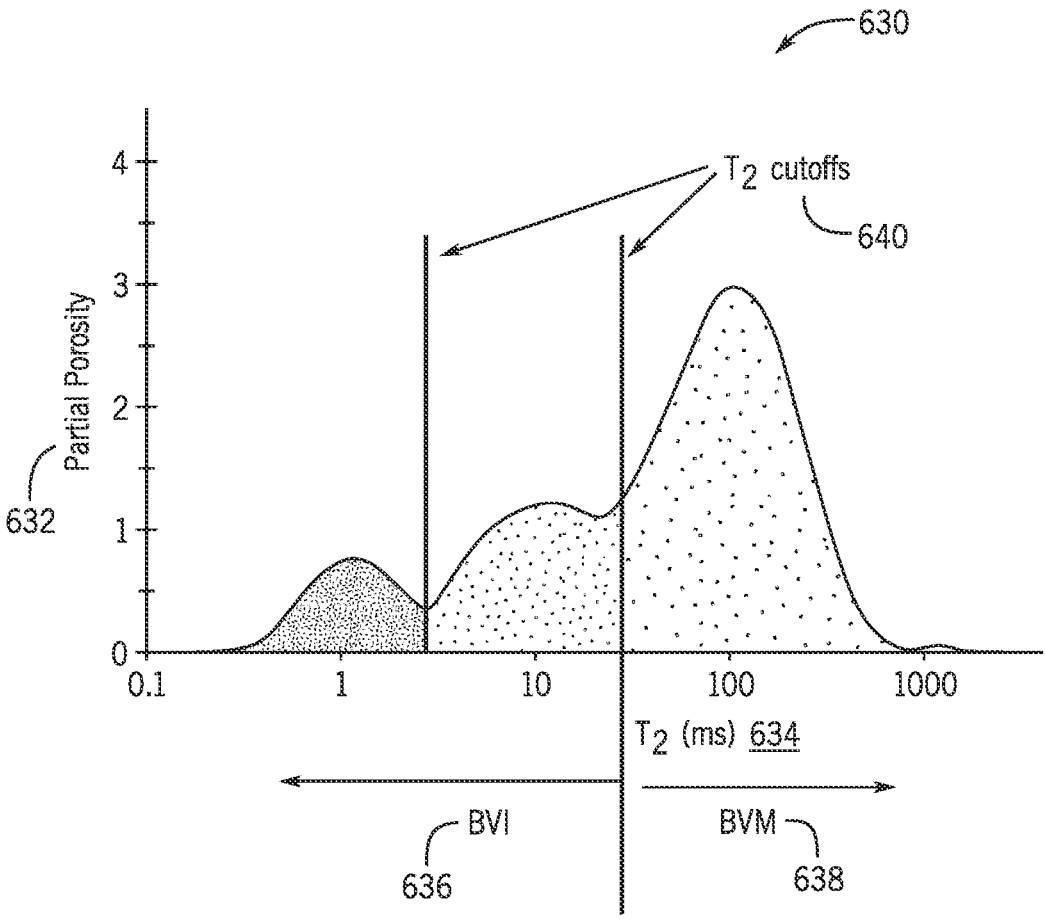
Figure 6C:
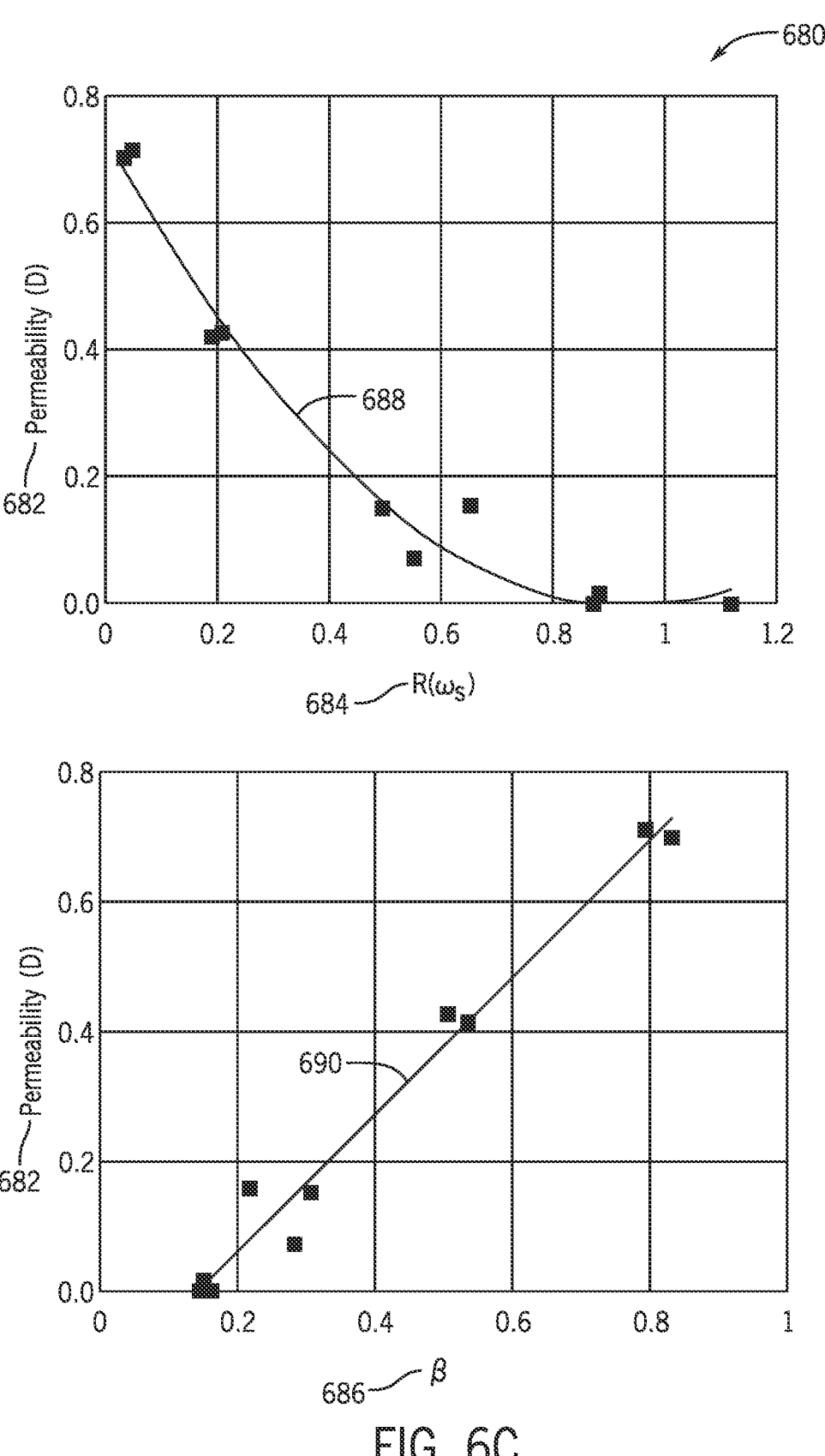

In at least one embodiment, FIGS. 6A-6C illustrates a workflow 600 and associated representations 630, 680 of providing a further models within a third estimation model that now includes permeability measures of a porous formation using PCI values, such as from FIGS. 4A-4D and/or 5A, 5B, along with NMR measurements that integrates explicitly the PCI values. FIGS. 6A-6C enable further determination of permeability measures of a porous formation using PCI values, such as from the embodiments of FIGS. 4A-4D and/or FIGS. 5A, 5B, along with NMR measurements that integrates explicitly the PCI values. As such, FIGS. 6A-6C represents an embodiment that may be also part of the third estimation model. In at least one embodiment, therefore, a third estimation model is generated based in part on relating the structural property values (such as PCI values, tortuosity values, pore size distribution values, pore throat size values, pore throat size distribution values, or cementation factor values) to the petrophysical property values (such as permeability and Archie's texture parameters (m & n)) of the plurality of porous samples.

With reference to FIG. 6A, PCI values for a sample (or representation) of a porous formation is determined, in step 602, from the multi-frequency dielectric property values, including permittivity and conductivity property values. This may be as in the case of the embodiments in FIGS. 4A-4D and/or 5A, 5B. Step 604 is used to determine total porosity $\phi_t$ and pore size distribution determined using NMR $T_2$ or $T_1$ measurements, which are measurements taken at determined pulse sequences that cover a full or a partial decay of an applied air wave-based signal (that may be electromagnetic radiation). Total porosity may be taken as the sum of partial porosity 632 at each T2-bin 634. Pore size distribution is converted from NMR T2 distribution 630. As such, step 604 represents, in part, an air wave-based subsystem to provide air medium-based signals (relating to the NMR feature) for the porous formation. In at least one embodiment, such NMR measurements may be performed either in the laboratory or in the downhole of a wellbore.

Step 606 is to determine a permeability model that relates or associates NMR (T2) measurements from step 602 and PCI measurements from at least the second estimation model or from the representation part of the second estimation model, using the permittivity and conductivity from step 604. Step 606 provides a permeability model that may be part of the third estimation model and represented as:

$$k = f(PCI, \phi_t, T_2) \qquad \text{Equation (13).}$$

In a similar manner as discussed with respect to the first or the representation part of the second estimation models, PCI values, total porosity, and NMR T2 values may be provided as part of a hypothesis equation (permeability-hypothesis equation) forming a proposed Equation (13). Equation (13) may be a linear, polynomial, logarithmic, exponential, logistic, or power function. In at least one embodiment, this part of the third estimation model uses a cost function for the hypothesis, where the cost function can be minimized to find appropriate values of constants to correlate permeability to PCI values, total porosity, and NMR T2 values.

FIG. 6B illustrates further relation or association between porosity and NMR T2 values. The permeability model in Equation (13) can be informed using further forms or terms, such as:

$$k = C_1 (\phi_t)^{C_2} \left( \frac{PCI}{1 - PCI} \right)^{C_3}. \qquad \text{Equation (14)}$$

In Equation (14), $C_1$, $C_2$ and $C_3$ are constants. In another example, the permeability model in Equation (13) can be informed using a different form than Equation (14):

$$k = \left( \frac{\phi}{c} \right)^a \left( \frac{PCI \cdot BVM}{BVI + (1 - PCI) \cdot BVM} \right)^b. \qquad \text{Equation (15)}$$

In Equation (13), a, b, and c are constants that may be determined using a cost function minimization feature as in the case of the first estimation model and the representation feature of the second estimation model. Partial porosity in Equation (15) may be determined from the NMR measurements. Further, as to the bulk volume movable (BVM) 638 and bulk volume irreducible (BVI) 636 values, FIG. 6B illustrates that these values share relationship with the NMR T2 measurements 634. A distribution of the NMR T2 measurements 634, along with the partial porosity 632, may be used with defined cutoffs 640, and then applied to Equation (15). As such, Equations (14) and (15), along with the graphical representation in FIG. 6B forms part of the third estimation model. At least one processor can execute the instructions to further cause a system for analysis of porous formations to determine, using the air-medium-based signals from step 604, one or more of total porosity and pore size distribution information.

FIG. 6C illustrates two permeability models 680 within the third estimation model. A first permeability model is between the permeability 682 of porous samples and $R(\omega_s)$ values 684. This first permeability model has a power function 688 that fits the permeability and the $R(\omega_s)$ values. In the power function (such as, y=ax^b), b may be a negative integer and x may be positive. A second permeability model is between the permeability 682 of porous samples and β values 686. This second permeability model has a linear function 690 that fits the permeability and the β values. As discussed with respect to the representation model in the second estimation model, $R(\omega_s)$ values and β values can be correlated to the PCI values. These features, therefore, represent modeling the pore size distribution information (such as using FIG. 6B) or the representation of the porous formation, along with the permittivity and conductivity measures, to generate a third estimation model associated with the pore features for the porous formation (such as partial porosities).

In at least one embodiment, FIG. 7 illustrates a workflow and associated representations 700 of providing a fourth estimation model using one or more of parts of the first estimation model and second estimation model. The workflow and associated representations 700 illustrate that Archie's parameters (such as m and n) may be modeled using the multi-frequency dielectric property values, to secure information of an effect of the PCI and of wettability.

The workflow and associated representations 700 illustrate modeling of Archie's parameters (m and n), as a function of PCI, $R(\omega_s)$ and β, as part of the fourth estimation model. Step 702 is for obtaining porous samples, representing porous formations. The porous formation has varying porosities. Step 704 is for creating digital representations of such porous formations, while ensuring that different PCI values are used. In at least one embodiment, this may be done in a similar modification manner discussed with respect to step 506 in FIG. 5A, for a representation within a second estimation model. As such, part of the representation modeling in the second estimation model may be used for the workflow and associated representations 700.

Step 706 is for performing (such as, by simulating) fluid displacement processes, in the representations of step 704, to obtain first Archie's parameters. Step 708 may be concurrent or subsequent to step 706. Step 708 is for performing fluid displacement processes, in the physical porous formation representations of step 704, to obtain second Archie's parameters. A fluid-based physical and simulation subsystem can perform physical fluid-based testing and simulated fluid-based testing for the porous formation. The simulation subsystem uses the representation of the porous formation in step 706. Aspects of such physical fluid-based testing and simulated fluid-based testing is discussed with reference to FIG. 8. These steps therefore represent generation of simulated Archie's m and n parameters from the representation of the porous formation and generation of physical Archie's m and n parameters from the physical fluid-based test.

Step 710 and 712, similarly, may be performed concurrently or subsequently, relative to each other. These steps are to perform or conduct multi-frequency dielectric property values (such as for permittivity and conductivity) for the representation (in step 710) and for the physical porous formation (in step 712). Step 710 therefore represents a similar operation in Step 510 of FIG. 5A (using the representation) and Step 712 therefore represents a similar operation in step 496 of FIG. 4A (using the physical porous formation). Such steps therefore represent determination of simulated permittivity and conductivity measures associated with the electrical signals applied to the representation of the porous formation.

Step 714 is to model or build a third estimation model. Such a third estimation model may use a function that relates or associates the first and/or second Archie's parameters to the subsequently determined PCI values, $R(\omega_s)$ values, and β values:

$$m \text{ or } n = f(PCI, R(\omega_s), \beta) \qquad \text{Equation (16).}$$

To build or model the fourth estimation model, determined PCI values, $R(\omega_s)$ values, and β values may be plotted, and a function or curve is fitted to find a best fit. Such aspects in step 714 represents a variety of verifications and numerical simulations performed under controlled conditions. For example, a linear, a polynomial, logarithmic, exponential, logistic, and a power function, equation, or curve may be determined. Then constants (such as model or fit parameters) within the function, equation, or curve may be determined as initial values. The initial values may be modified by a minimization of errors between a hypothesis (Archie parameter-hypothesis) using PCI values, $R(\omega_s)$ values, and β values. In at least one embodiment, for the hypothesis, a cost function may be defined, and minimization of the cost function may be performed to find appropriate values for the constants to correlate PCI values, $R(\omega_s)$ values, and β values.

Step 714 at least includes a feature of generating frequency-dependent values ($R(\omega_s)$ values) and constant values (β values) from the permittivity and conductivity measures of the physical porous formations, such as from the embodiments in FIGS. 4A-4D. Step 714 also includes a feature to generate the frequency-dependent values ($R(\omega_s)$ values) and constant values (β values) from the simulated permittivity and conductivity measures of step 710. In at least one embodiment, the permittivity and conductivity measures may be combined with the simulated permittivity and conductivity measures prior to being used in step 714 for the frequency-dependent values ($R(\omega_s)$ values) and constant values (β values).

Figure 8:
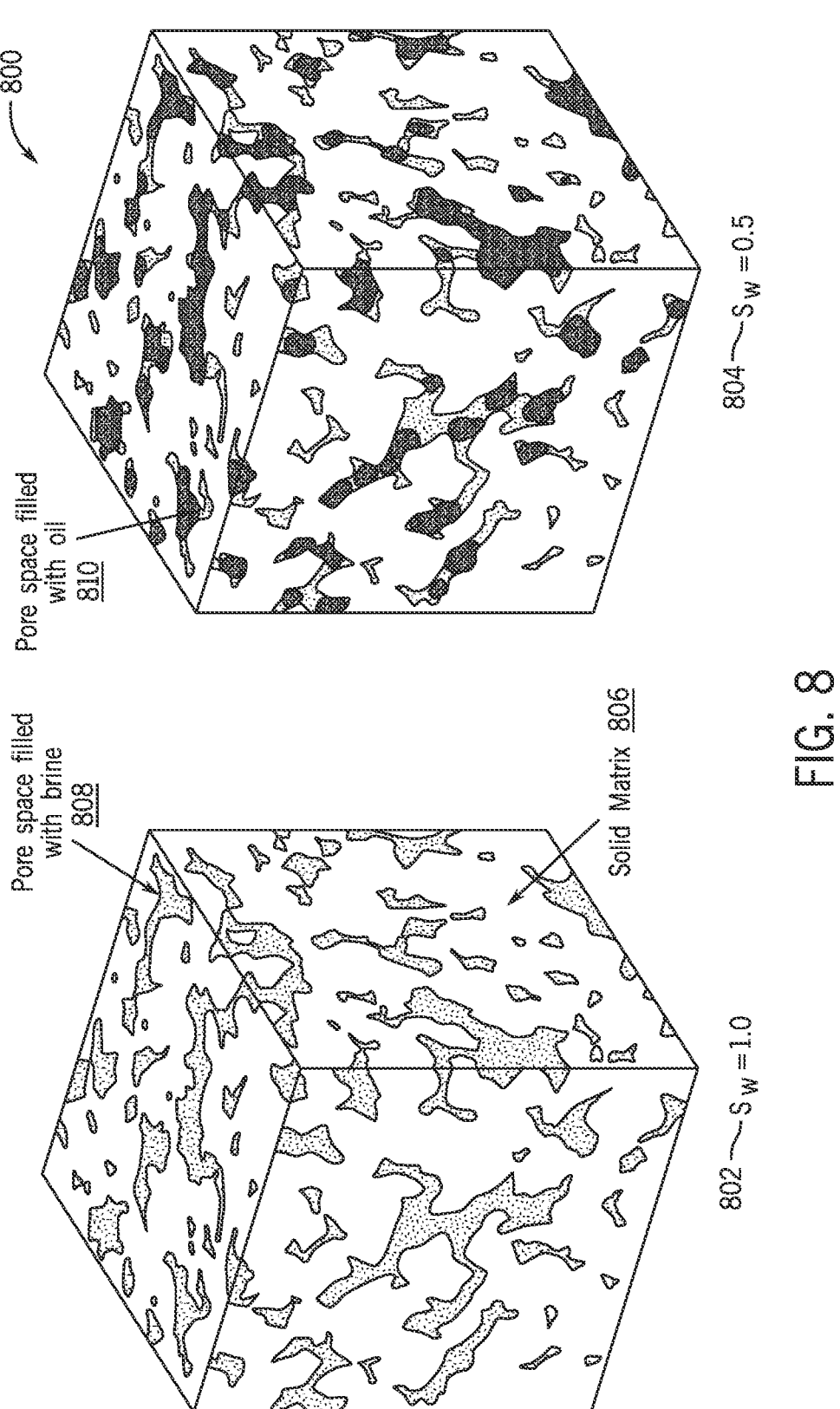
FIG. 8 illustrates representations of porous formations that includes distribution of brine and oil in the pores, under the water saturation as part of a physical fluid-based testing and simulated fluid-based testing for the downhole rock formation, according to at least one embodiment.

Step 714 enables modeling of the simulated Archie's m and n parameters and the physical Archie's m and n parameters along with the frequency-dependent values and the constant values to generate the fourth estimation model that is associated with the pore features for the porous formation. FIG. 8 illustrates representations of porous formations that includes distribution of brine and oil in the pores, under the water saturation as part of a physical fluid-based testing and simulated fluid-based testing (also known as a Drainage and Imbibition Standard tests) for the porous formation, according to at least one embodiment. FIG. 8 illustrates the simulation results 800 of fluid displacement process in the representation 806 of a porous formation, which has a porosity of 20% and pore connectivity index of 1. Continuous changes of an amount of each fluid and its spatial distribution in pore spaces can alter conductivity and permittivity of a sample used to test or train a third estimation model. Archie's parameters can be directly determined as discussed with respect to step 714 using a fitting function hypothesis and cost function that is minimized. In FIG. 8, the representations 806 illustrate the distribution of brine 808 and oil 810 in the rock pore space under different water saturations, of $S_w$=1.0 (reference number 802) and $S_w$=0.5 (reference number 804).

Figure 9:
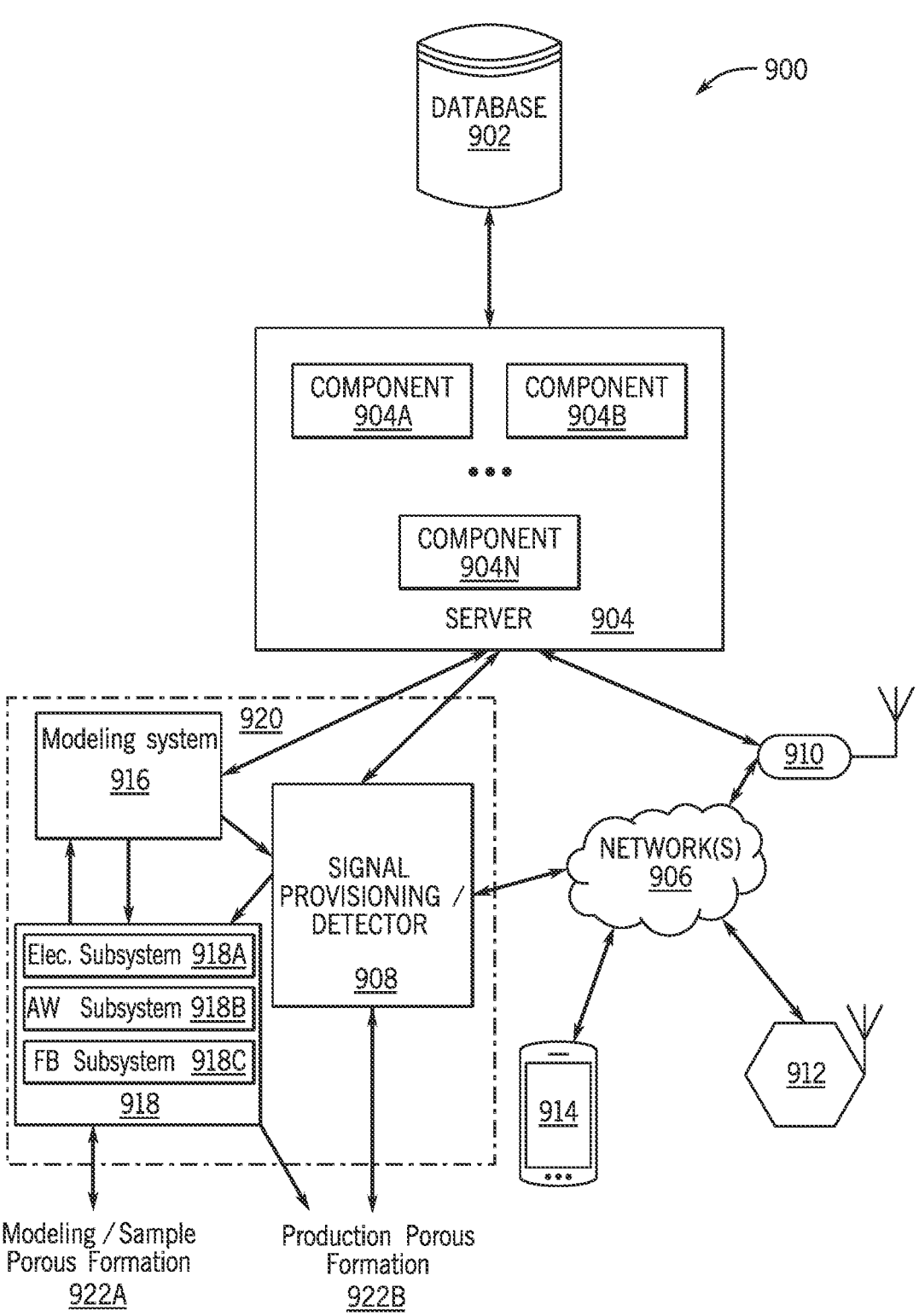
FIG. 9 illustrates computer and network aspects for a system for analysis of a downhole rock formation, according to at least one embodiment.

In at least one embodiment, computer and network aspects 900 for a downhole system as illustrated in FIG. 9, may be used as described herein. In at least one embodiment, these computer and network aspects 900 may include a distributed system. In at least one embodiment, a distributed system 900 may include one or more computing devices 912, 914. In at least one embodiment, one or more computing devices 912, 914 may be adapted to execute and function with a client application, such as with browsers or a standalone application, and are adapted to execute and function over one or more network(s) 906.

In at least one embodiment, a server 904, having components 904A-N may be communicatively coupled with computing devices 912, 914 via network 906 and via a receiver device 908, if provided. In at least one embodiment, components 912, 914 include processors, memory and random-access memory (RAM). In at least one embodiment, server 904 may be adapted to operate services or applications to manage functions and sessions associated with database access 902 and associated with computing devices 912, 914. In at least one embodiment, server 904 may be associated with a signal provisioning or detector device 908 of a downhole tool 920.

In at least one embodiment, server 904 may be at a wellsite location, but may also be at a distinct location from a wellsite location. In at least one embodiment, such a server 904 may support a downhole tool or wireline system 920 for analysis of sample and of test porous formation 922A, B within a downhole tool. Such a tool or wireline system 920 may be partly downhole and partly at a surface level. Such a tool or wireline system 920 may include subsystems 918A, B, C, to perform functions described throughout herein. The subsystems may be modules that may be able to test or train a system on a surface level using sample porous formations 922A and simulations (or other representations, including images) thereof. The subsystem may be encased in one or more computing devices having at least one processor and memory so that the at least one processor can perform functions based in part on instructions from the memory executing in the at least one processor. In at least one embodiment, even though illustrated together, the system boundary 918 may be around a distributed system having subsystems 918A-C in different geographic locations, including downhole and surface areas.

A signal provisioning or detector device 908 of a downhole tool 920 is provided to test downhole rock formations 922B. In at least one embodiment, a system for analysis of a porous formation of a wellbore includes a wireline system for the analysis, where such a system may be adapted to transmit, either through wires or wireless, information received therein, from a signal provisioning or detector device back to the surface. In at least one embodiment, modeling performed using modeling or sample porous formations 922A (and representations thereof) may be recorded within a modeling system 916. Required signals for modeling/sample porous formations 922A may be determined by a modeling system 916 and provided by one of subsystems 918A-C.

The modeling system 916 can communicate to a signal provisioning and detector 908 and to subsystems 918A-C to enable testing of downhole rock formations 922B using the models stored in the modeling system 916. For example, each model may require specific signals to gather specific input to be used as testing data against trained ML/AI algorithms. Such signals may include electrical signals to be applied from an electrical subsystem 918A, air wave-based signals provided from an air wave-based subsystem 918B, and at least physical fluid-based testing for a downhole rock formation 922B provided from the fluid-based physical and simulation subsystem 918C. Detected results from the electrical signals may be used to determine permittivity and conductivity (and other measures) and to verify its fit within a first, a second, or even a third estimation model for PCI value estimates, for permeability measurements, and for Archie's parameters for the downhole rock formation 922B. In at least one embodiment, a system 920 can adjust an estimated PCI value for a downhole rock formation 922B based in part on an estimated PCI value In at least one embodiment, such information may be received in a receiver device and transmitted from there. In at least one embodiment, a server 904 may function as a signal provisioning or detector device (with a transmitter providing the actual signal and receiving a return signal) but may also perform other functions. In at least one embodiment, one or more component 904A-N may be adapted to function as a signal provisioning or detector device within a server 904. In at least one embodiment, one or more components 904A-N may include one or more processors and one or more memory devices adapted to function as a detector or receiver device, while other processors and memory devices in server 904 may perform other functions.

In at least one embodiment, a server 904 may also provide services or applications that are software-based in a virtual or a physical environment (such as to support the simulations referenced herein). In at least one embodiment, when server 904 is a virtual environment, then components 904A-N are software components that may be implemented on a cloud. In at least one embodiment, this feature allows remote operation of a system for analysis of a porous formation using a wireline system that is a tool, as discussed at least in reference to FIGS. 1-8. In at least one embodiment, this feature also allows for remote access to information received and communicated between any of aforementioned devices. In at least one embodiment, one or more components 904A-N of a server 904 may be implemented in hardware or firmware, other than a software implementation described throughout herein. In at least one embodiment, combinations thereof may also be used.

In at least one embodiment, one computing device 910-914 may be a smart monitor or a display having at least a microcontroller and memory having instructions to enable display of information monitored by a signal provisioning or detector device. In at least one embodiment, one computing device 910-912 may be a transmitter device to transmit directly to a receiver device or to transmit via a network 906 to a receiver device 908 and to a server 904, as well as to other computing devices 912, 914.

In at least one embodiment, other computing devices 912, 914 may include portable handheld devices that are not limited to smartphones, cellular telephones, tablet computers, personal digital assistants (PDAs), and wearable devices (head mounted displays, watches, etc.). In at least one embodiment, other computing devices 912, 914 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 912, 914 may support applications designed as internet-related applications, electronic mail (email), short or multimedia message service (SMS or MMS) applications and may use other communication protocols. In at least one embodiment, other computing devices 912, 914 may also include general purpose personal computers and/or laptop computers running such operating systems as Microsoft Windows®, Apple Macintosh®, and/or Linux®. In at least one embodiment, other computing devices 912, 914 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 912, 914.

In at least one embodiment, network(s) 906 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 906 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 904 runs a suitable operating system, including any of operating systems described throughout herein. In at least one embodiment, server 904 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 902 is supported by database server feature of a server 904 provided with front-end capabilities. In at least one embodiment, such database server features include those available from Oracle®, Microsoft®, Sybase®, IBM® (International Business Machines), and/or variations thereof.

In at least one embodiment, a server 904 is able to provide feeds and/or real-time updates for media feeds. In at least one embodiment, a server 904 is part of multiple server boxes spread over an area but functioning for a presently described process for analysis of a porous formation. In at least one embodiment, server 904 includes applications to measure network performance by network monitoring and traffic management. In at least one embodiment, a provided database 902 enables information storage from a wellsite, including user interactions, usage patterns information, adaptation rules information, and other information.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

Operations of methods in FIGS. 4D, 5A, 6A, and 7, and the sub-steps described herein can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

What is claimed is:

1. A method for a wellbore operation, the method comprising:
   determining dielectric property values for a plurality of porous samples, the porous samples being a representation or artificially-produced porous samples;
   obtaining structural property values for the plurality of porous samples;
   generating a model, using a processor, for petrophysical property values of the plurality of porous samples by relating the dielectric property values and the structural property values;

measuring, in a wellbore and using a dielectric sensor, a rock formation dielectric property value of a downhole rock formation in the wellbore;
   determining, using the processor, a rock formation petrophysical property value for the downhole rock formation using the model and the measured rock formation dielectric property value; and
   performing the wellbore operation based at least in part on the rock formation petrophysical property value;
   wherein the wellbore operation comprises one or more of changing a well trajectory, controlling a steering device, or sending a downlink.

2. The method of claim 1, wherein the dielectric property values is one of a permittivity value, a conductivity value, or a resistivity value.

3. The method of claim 1, wherein the structural property values is a measure of a pore connectivity.

4. The method of claim 3, further comprising:
   determining the measure of the pore connectivity using one of a 2D or a 3D representation of the plurality of porous samples.

5. The method of claim 1, further comprising:
   determining the dielectric property values for the plurality of porous samples using multiple frequencies to provide frequency-dependent dielectric property values for individual ones of the dielectric property values for the plurality of porous samples.

6. The method of claim 5, wherein the multiple frequencies are within a range 10 MHz to 2 GHz.

7. The method of claim 5, further comprising:
   generating the model for the petrophysical property values from a combination of estimation models, wherein a first one of the estimation models relates the frequency-dependent dielectric property values to the multiple frequencies.

8. The method of claim 7, further comprising:
   selecting a frequency of the multiple frequencies;
   determining, for individual ones of the plurality of porous samples, an individual one of the frequency-dependent dielectric property values at the selected frequency using the first one of the estimation models; and
   generating a second one of the estimation models based in part on relating the individual one of the frequency-dependent dielectric property values to the structural property values for the plurality of porous samples.

9. The method of claim 8, wherein the structural property values comprises a measure of a pore connectivity.

10. The method of claim 8, further comprising:
    determining first estimation model parameter values to enable a fit for the frequency-dependent dielectric property values of the first one of the estimation models; and
    generating the second one of the estimation models based in part on relating the first estimation model parameters values to the structural property values.

11. The method of claim 8, further comprising:
    generating a third one of the estimation models based in part on relating the structural property values to the petrophysical property values of the plurality of porous samples.

12. The method of claim 1, further comprising:
    determining the dielectric property values using one or more simulations or one or more of multi-frequency dielectric measurements.

13. The method of claim 1, further comprising:
    generating a plurality of estimation models to contribute to the model, individual ones of the plurality of estimation models comprising one or more of the structural property values and providing a model parameter to be used to determine the rock formation petrophysical property value.

14. The method of claim 13, further comprising:

storing the plurality of estimation models in a non-volatile memory, wherein determining the rock formation petrophysical property value includes selecting at least one of the plurality of estimation models from the non-volatile memory to be used with the measured rock formation dielectric property value.

15. The method of claim 1, wherein the rock formation petrophysical property value is an Archie parameter value.

16. The method of claim 1, wherein the rock formation petrophysical property value is a permeability value.

17. The method of claim 1, further comprising:

generating the model by obtaining nuclear magnetic resonance (NMR) parameter values, wherein the NMR parameter values include at least values for a total porosity and for partial porosities.

18. The method of claim 1, further comprising:

generating the model based in part on curve fitting, wherein the curve fitting includes one of a polynomial curve, an exponential curve, a logarithmic curve, a logistic curve, and a power curve for the relating of the dielectric property values and the structural property values.

19. The method of claim 1, further comprising:

determining the rock formation petrophysical property value using a processor in a bottom hole assembly (BHA) that is in the downhole rock formation.

20. A system for a wellbore operation, the system comprising:

a dielectric sensor used in a wellbore and configured to measure a rock formation dielectric property value of a downhole rock formation of the wellbore; and at least one processor and memory comprising instructions that when executed by the at least one processor cause the system to:

determine dielectric property values for a plurality of porous samples, the porous samples being a representation or artificially-produced porous samples;

obtain structural property values for the plurality of porous samples;

generate a model for petrophysical property values of the plurality of porous samples by relating the dielectric property values and the structural property values; and determine a rock formation petrophysical property value for the downhole rock formation using the model and the measured rock formation dielectric property value, wherein the rock formation petrophysical property value is used at least in part to perform the wellbore operation;

wherein the wellbore operation comprises one or more of changing a well trajectory, controlling a steering device, or sending a downlink.

21. The system of claim 20, wherein the memory comprising instructions that when executed by the at least one processor further cause the system to:

determine the dielectric property values for the plurality of porous samples using multiple frequencies to provide frequency-dependent dielectric property values for individual ones of the dielectric property values for the plurality of porous samples.

* * * * *